US010228930B2

(12) United States Patent
Srinivasan et al.

(10) Patent No.: US 10,228,930 B2
(45) Date of Patent: Mar. 12, 2019

(54) OFFLOADING NETWORK CONNECTIVITY AND EXECUTION TASKS TO AN ASSISTANT DEVICE

(71) Applicant: Microsoft Technology Licensing, LLC, Redmond, WA (US)

(72) Inventors: Harish Srinivasan, Sammamish, WA (US); Benjamin M. Schultz, Bellevue, WA (US); James C. Gray, Redmond, WA (US); Nishad Mulye, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 15/009,594

(22) Filed: Jan. 28, 2016

(65) Prior Publication Data
US 2017/0220332 A1 Aug. 3, 2017

(51) Int. Cl.
*G06F 9/445* (2018.01)
*G06F 8/65* (2018.01)
(Continued)

(52) U.S. Cl.
CPC ............. *G06F 8/65* (2013.01); *G06F 9/452* (2018.02); *G06F 9/5094* (2013.01);
(Continued)

(58) Field of Classification Search
USPC .......................................................... 726/7
See application file for complete search history.

(56) References Cited

U.S. PATENT DOCUMENTS 6,141,705 A * 10/2000 Anand ................. G06F 9/5044
709/203
7,363,632 B2 * 4/2008 Wong .................... G06F 9/4413
719/313
(Continued)

FOREIGN PATENT DOCUMENTS

JP 2006190320 A 7/2006
WO 2004008781 A2 1/2004
(Continued)

OTHER PUBLICATIONS

"Where Windows Searches for Drivers," available at <<https://msdn.microsoft.com/en-us/library/windows/hardware/ff553973(v=vs.85).aspx>>, Microsoft Corporation, Redmond, Washington, accessed on Jan. 24, 2016, 2 pages.
(Continued)

*Primary Examiner* — Kenneth W Chang
*Assistant Examiner* — Badridot Champakesanatusptodotgov
(74) *Attorney, Agent, or Firm* — Rainier Patents, P.S.

(57) ABSTRACT

Functionality is described herein for performing at least one network connectivity task on a client device with the aid of one or more assistant devices. In some implementations, a client device (such as a smartphone, desktop personal computing device, etc.) relies on an assistant device to assist it in updating its programs, including its driver programs. In other implementations, a client device relies on an assistant device in establishing a network connection with a network-accessible entity. Functionality is also described herein for performing at least one program execution task on a client device with the aid of one or more assistant devices. For instance, the client device may rely on the assistant device to assist it in executing a driver program. The driver pro-
(Continued)

US 10,228,930 B2

Page 2 gram, in turn, enables the client device to interact with a peripheral device or some other component.

20 Claims, 20 Drawing Sheets

(51) Int. Cl.
*H04L 29/08* (2006.01)
*H04L 29/06* (2006.01)
*G06F 9/50* (2006.01)
*G06F 13/10* (2006.01)
*H04W 76/10* (2018.01)
*G06F 9/451* (2018.01)
*G06F 21/57* (2013.01)

(52) U.S. Cl.
CPC ............ *G06F 13/102* (2013.01); *G06F 21/57* (2013.01); *H04L 63/0272* (2013.01); *H04L 63/1433* (2013.01); *H04L 67/16* (2013.01); *H04L 67/34* (2013.01); *H04W 76/10* (2018.02)

(56) References Cited

U.S. PATENT DOCUMENTS

| | | | | |
|---|---|---|---|---|
| 7,388,742 | B2 * | 6/2008 | Cargin, Jr. | G06F 1/1613 361/679.01 |
| 7,523,399 | B2 * | 4/2009 | Britt, Jr. | G06F 8/60 715/740 |
| 7,574,713 | B2 * | 8/2009 | Tabares | G06F 9/4411 710/10 |
| 7,814,200 | B2 * | 10/2010 | Lusher | H04L 67/306 709/224 |
| 7,831,633 | B1 * | 11/2010 | Chan | G06F 17/30569 707/803 |
| 8,065,673 | B2 * | 11/2011 | D'Souza | G06F 9/485 709/203 |
| 8,224,971 | B1 * | 7/2012 | Miller | H04L 12/4641 370/254 |
| 8,438,315 | B1 * | 5/2013 | Tao | G06F 9/4411 710/5 |
| 8,539,515 | B1 * | 9/2013 | Protassov | G06F 9/4411 711/6 |
| 8,607,040 | B2 * | 12/2013 | Zimmer | G06F 1/3203 713/2 |
| 8,918,547 | B2 * | 12/2014 | Cawse | G06F 13/385 710/15 |
| 8,949,815 | B2 * | 2/2015 | Phaedrus | G06F 8/65 717/168 |
| 9,104,412 | B2 * | 8/2015 | Lynar | G06F 1/329 |
| 9,137,185 | B2 | 9/2015 | Costenaro et al. | |
| 9,158,540 | B1 * | 10/2015 | Tzelnic | G06F 11/108 |
| 9,268,959 | B2 * | 2/2016 | Paczkowski | G06F 21/74 |
| 9,509,659 | B2 * | 11/2016 | Anipko | H04L 29/12264 |
| 10,089,706 | B1 * | 10/2018 | Krasner | G06T 1/20 |
| 2002/0161919 | A1 * | 10/2002 | Boucher | H04L 29/06 709/238 |
| 2003/0027563 | A1 * | 2/2003 | Herle | G06F 8/65 455/419 |
| 2003/0084435 | A1 * | 5/2003 | Messer | G06F 9/505 717/174 |
| 2003/0195951 | A1 * | 10/2003 | Wittel, Jr. | H04L 67/34 709/220 |
| 2005/0017946 | A1 * | 1/2005 | Park | G06F 1/1601 345/156 |
| 2005/0071746 | A1 * | 3/2005 | Hart | G06F 3/1206 715/200 |
| 2005/0278459 | A1 * | 12/2005 | Boucher | H04L 29/06 709/250 |
| 2006/0130053 | A1 * | 6/2006 | Buljore | H04W 8/245 717/173 |
| 2007/0008327 | A1 * | 1/2007 | Howell | G06T 1/00 345/506 |
| 2007/0098010 | A1 * | 5/2007 | Dube | G06F 9/5044 370/463 |
| 2007/0130352 | A1 * | 6/2007 | Chhabra | H04L 63/0485 709/230 |
| 2009/0222497 | A1 * | 9/2009 | Ryan | G06F 8/65 |
| 2010/0242037 | A1 * | 9/2010 | Xie | G06F 8/61 717/178 |
| 2010/0272258 | A1 * | 10/2010 | Sadovsky | G06F 9/5027 380/255 |
| 2011/0276724 | A1 * | 11/2011 | Mullis, II | G06F 9/4415 710/8 |
| 2012/0005500 | A1 * | 1/2012 | Tamura | G06F 1/3209 713/320 |
| 2012/0250682 | A1 * | 10/2012 | Vincent | H04L 12/4633 370/390 |
| 2012/0250686 | A1 * | 10/2012 | Vincent | H04L 12/4633 370/392 |
| 2013/0298192 | A1 * | 11/2013 | Kumar | G06F 21/52 726/3 |
| 2013/0326493 | A1 * | 12/2013 | Poonamalli | G06F 8/65 717/168 |
| 2014/0189861 | A1 * | 7/2014 | Gupta | H04L 63/08 726/22 |
| 2015/0138094 | A1 * | 5/2015 | Kim | G06F 1/1632 345/168 |
| 2015/0154111 | A1 * | 6/2015 | D'Abreu | G06F 12/0246 714/6.11 |
| 2015/0248283 | A1 * | 9/2015 | Gschwind | G06F 9/4416 717/172 |
| 2016/0294851 | A1 * | 10/2016 | Langton | H04L 63/1416 |
| 2016/0316314 | A1 * | 10/2016 | Swaminathan | H04L 67/26 |
| 2016/0366167 | A1 * | 12/2016 | Yumer | H04L 63/1425 |
| 2017/0054654 | A1 * | 2/2017 | Garg | H04L 43/0817 |
| 2017/0149951 | A1 * | 5/2017 | Antonopoulos | H04M 1/72527 |
| 2017/0199559 | A1 * | 7/2017 | Bengualid | G06F 1/329 |

FOREIGN PATENT DOCUMENTS

| | | | | |
|---|---|---|---|---|
| WO | WO 2004008781 A2 * | 1/2004 | ............... | G06F 8/65 |
| WO | WO-2004008781 A2 * | 1/2004 | ............... | G06F 8/65 |

OTHER PUBLICATIONS

"Cisco Visual Networking Index: Forecast and Methodology, 2014-2019," available at <<http://www.cisco.com/c/en/us/solutions/collateral/service-provider/ip-ngn-ip-next-generation-network/white_paper_c11-481360.pdf>>, white paper, Cisco Systems, Inc., San Jose, California, May 27, 2015, 14 pages.

"Continuum," available at <<https://msdn.microsoft.com/en-us/library/windows/hardware/dn917883(v=vs.85).aspx>>, Microsoft Corporation, Redmond, Washington, accessed on Jan. 24, 2016, 13 pages.

"How Network Printing Works," available at <<https://technet.microsoft.com/en-us/library/cc783789(v=ws.10).aspx>>, Microsoft Corporation, Redmond, Washington, May 28, 2003, 9 pages.

"General Printer Attributes," available at <<https://msdn.microsoft.com/en-us/library/windows/hardware/ff549893(v=vs.85).aspx>>, Microsoft Corporation, Redmond, Washington, accessed on Jan. 24, 2016, 1 page.

"Hardware-assisted virtualization," available at <<Hardware-assisted virtualization>>, Wikipedia article, accessed on Jan. 24, 2016, 4 pages.

"Virtualization Extensions," available at <<http://www.arm.com/products/processors/technologies/virtualization-extensions.php>>, ARM Holdings plc, Cambridge, England, United Kingdom, accessed on Jan. 24, 2016, 1 page.

"Service discovery," available at <<https://en.wikipedia.org/wiki/Service_discovery>>, Wikipedia article, accessed on Jan. 24, 2016, 2 pages.

"Device Manager," available at <<https://en.wikipedia.org/wiki/Device_Manager>>, Wikipedia article, accessed on Jan. 24, 2106, 7 pages.

(56) References Cited

OTHER PUBLICATIONS

Greenberg, Andy, "Why the Security of USB is Fundamentally Broken," available at <<http://www.wired.com/2014/07/usb-security/>>, Wired, Jul. 31, 2014, 11 pages.

Goodin, Dan, "USB Killer," flash drive can fry your computer's innards in seconds, available at <<http://arstechnica.com/security/2015/10/usb-killer-flash-drive-can-fry-your-computers-innards-in-seconds/>>, ars technica, Oct. 14, 2015, 4 pages.

\* cited by examiner

OFFLOADING NETWORK CONNECTIVITY AND EXECUTION TASKS TO AN ASSISTANT DEVICE

BACKGROUND

Many users now regard their smartphones as portable computing devices for handling a host of general-purpose tasks, rather than mobile telephones for only making and receiving calls. This development enriches users, but also raises complications. For example, personal computing devices (such as, but not limited to, smartphones) operate in a technical realm of ever-changing applications, services, peripheral devices, operating systems, standards, and so on. A personal computing device may attempt to keep pace with these changes by frequently updating its software. But such an update strategy can overtax the limited resources of the personal computing device, leading to poor device performance and poor user experience. Further, in some cases, the update process can cause errors and other undesired effects, as when a software update contains malicious content.

SUMMARY

Functionality is described herein for performing at least one network connectivity task on a client device with the aid of one or more assistant devices. In some implementations, for instance, a client device (such as a smartphone, desktop personal computing device, etc.) relies on an assistant device to assist it in updating its programs, including its driver programs. For example, when called upon, the assistant device may download a driver program from an update service. The assistant device can then forward the driver program to the client device. Alternatively, or in addition, the assistant device can run the driver program using its own resources, when prompted to do so by a driver-triggering event.

According to another illustrative aspect, the client device invokes the services of the assistant device after determining a cost associated with an update operation. If the identified cost meets a first criterion, the client device will perform the update operation itself. If the identified cost meets a second criterion, the client device will offload at least part of the update process to the assistant device.

In other implementations, a client device relies on an assistant device in establishing a network connection with a network-accessible entity. For example, an assistant device may be called upon when the client device attempts to establish a Transmission Control Protocol (TCP) connection or other type of network connection. The assistant device then establishes the connection on behalf of the client device.

Overall, the assistant device reduces the burden placed on the limited resources of the client device when performing an update process or network connection task (or any other task involving interaction with a computer network). This effect, in turn, may result in improved performance of the client device, together with a good user experience. The functionality can also leverage the assistant device to reduce risk associated with a network connection task.

Functionality is also described herein for performing at least one program execution task on a client device with the aid of one or more assistant devices. For instance, a client device (such as a smartphone, desktop personal computing device, etc.) relies on an assistant device to assist it in executing a driver program. The driver program, in turn, enables the client device to interact with a peripheral device or some other component.

In some implementations, the assistant device has processing and memory resources and may run the driver program using an assistant device (AD) driver execution component. In other implementations, the assistant device constitutes a storage resource without execution capabilities. Here, the client device uses hardware-assisted virtualization to execute a driver program based on code provided by the assistant device.

According to another illustrative aspect, the assistant device can optionally apply one or more safeguards to protect the client device and the assistant device in carrying out their transactions. For instance, the assistant device (and/or some other agent) can perform analysis to determine whether the driver program poses any security-related risks. In addition, or alternatively, the assistant device can interact with the client device via a general-purpose protocol-independent bridge. In addition, or alternatively, the assistant device can use at least one authentication protocol to ensure that only properly authenticated client devices interact with the assistant device. In addition, or alternatively, the assistant device can use a Virtual Private Network (VPN) to interact with the client device, and/or can use a VPN to otherwise manage security on behalf of the client device, and so on.

According to another illustrative aspect, the assistant device can emulate running of the driver program in a specified execution environment.

Overall, the assistant device improves the ability of a client device to execute driver programs (and other programs); this effect, in turn, enables the client device to more successfully interact with a greater universe of peripheral devices and other components. The assistant device also reduces the burden placed on the limited resources of the client device when executing program tasks. The assistant device can also reduce risk associated with running a driver program (and other programs).

The above functionality can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
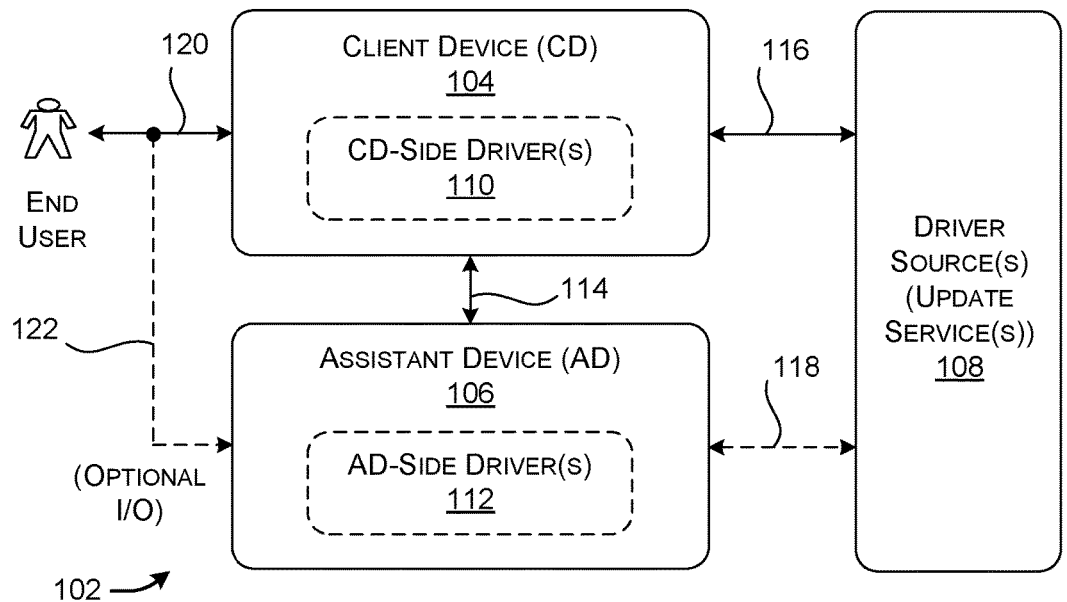
FIG. 1 shows an overview of a system that includes a client device and an assistant device. In one context, the assistant device provides assistance to the client device in the process of updating programs, such as driver programs.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes systems that enable a client device to carry out various tasks in a resource-efficient manner, such as, but not limited to, program downloading tasks and program execution tasks. Section B sets forth illustrative methods which explain the operation of the systems of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

Functionality is described herein for assisting a client device in performing one or more processing tasks using one or more assistant devices. Here, a client device can correspond to any computing device of any type, including, without limitation, a traditional desktop personal computing device, a laptop computing device, a game console device, a smartphone (or any other type of mobile telephone), a tablet-type computing device, a media-consumption device (e.g., a music-playing device, an electronic book-reader device, etc.), a wearable computing device, and so on, or combination thereof. In some implementations presented below, the assistant device corresponds to a portable unit that is typically placed in the same local environment as the client device. For example, the end user who is interacting with a stationary personal computing device may place an assistant device next to the personal computing device, e.g., on a desktop next to the personal computing device. An end user who is interacting with a mobile personal computing device (e.g., a smartphone) may carry the assistant device as he or she moves within a physical environment. But these examples do not exhaust the possibilities; in other cases, an assistant device can be located at a remote site relative to the end user who interacts with a client device (such as a remote "cloud" resource site). In still other cases, a single client device can interact with two or more assistant devices, one after the other, or in parallel fashion. Alternatively, or in addition, two or more client devices can interact with a single assistant device.

The assistant device can accelerate or otherwise facilitate any process that can be performed on the client device. Subsection A.2 sets forth an example in which the assistant device provides help in downloading a program (such as a driver program), or setting up a network connection. Subsection A.3 sets forth an example in which an assistant device provides help in executing a driver program. Subsection A.4 presents additional examples of processes that can be accelerated or otherwise facilitated. Subsection A.5 describes the extension of the previous examples to multi-device scenarios, e.g., involving the use of two or more assistant devices and/or two or more client devices. Subsection A.6 describes power management techniques performed by the client device(s) and/or the assistant device(s).

A.2. Updating Drivers and Other Programs Using an Assistant Device

FIG. 1 shows an overview of a system 102 that includes a client device (CD) 104 and an assistant device (AD) 106. One or more sources 108 (referred to in the singular below) provide a collection of programs. In this context, the assistant device 106 provides assistance to the client device 104 in the process of updating programs which are obtained from the source 108.

To simplify the explanation, the description below describes the updating of programs in the specific context of the updating of driver programs. Each driver program enables the client device 104 to interact with a particular peripheral device (such as a particular input device or a particular output device), or some other component. But the principles set forth herein can be extended to the downloading of any program (including an application program) or the downloading of any content item (such as a document file, audio file, video file, etc.).

Further, as will be explained more fully in Subsection A.3, the client device 104 and the assistant device 106 can cooperate in different ways to execute (run) any driver program (or any other program), and/or to interact with any content item. In a first implementation, the client device 104 executes a driver program without the help of the assistant device 106. In a second implementation, the client device 104 cooperatively interacts with the assistant device 106 to execute a driver program.

To perform the above tasks, the client device 104 provides and operates on one or more CD-side drivers 110, while the assistant device 106 provides and operates on one or more AD-side drivers 112. More generally, the prefix CD indicates that a component is associated with the client device (CD), while the prefix AD indicates that a component is associated with the assistant device (AD). Additional information regarding the illustrative compositions of the client device 104 and the assistant device 106 is provided below.

The client device 104 is coupled to the assistant device 106 via a communication link 114. The communication link 114 can be implemented using any physical coupling mechanism (or mechanisms), governed by any protocol (or combination of protocols). For instance, without limitation, the communication link 114 can correspond to a Universal Serial Bus (USB) cable, an Ethernet cable, a BLUETOOTH wireless link, a Wi-Fi wireless link, etc.

In some implementations, the source 108 represents one or more repositories of information maintained by one or more network-accessible servers or services. The client device 104 interacts with the source 108 via any computer network, such as a local area network, a wide area network (e.g., the Internet), a point-to-point link, or any combination thereof. In that context, FIG. 1 shows a communication link 116, representing any communication mechanism that allows the client device 104 to interact with the computer network. Illustrative communication mechanisms include a wireless Wi-Fi connection, a wireless cell connection, a hardwired connection of any type(s), and so on.

FIG. 1 also indicates that the assistant device 106 can optionally interact with the computer network via a communication link 118. The link 118 can be use the same connection mechanism(s) and protocol(s) as the link 116, or different mechanism(s) and protocol(s). In another implementation, the assistant device 106 does not maintain a separate connection to the computer network. In that case, the assistant device 106 may interact with the computer network via whatever communication mechanism(s) that the client device 104 uses to interact with the computer network.

The end user may interact with the client device 104 via one or more peripheral devices (e.g., touch screens, keyboard devices, mouse devices, etc.) via a link 120. Optionally, the end user may also indirectly interact with the client device 104 via the assistant device 106, through a link 122. The links (120, 122) can represent any physical coupling mechanisms, governed by any protocol (or combination of protocols). For instance, without limitation, each of the links (120, 122) can correspond to a Universal Serial Bus (USB) cable, a BLUETOOTH wireless link, etc. For example, as will be explained more fully in the context of FIG. 7 (below), the assistant device 106 can also play a display-docketing role by projecting the user interface presentations produced by one or more applications onto a separate display device (not shown), where these applications run on the client device 104. The end user may use a keyboard, mouse device, etc. to interact with the user interface presentations via link 120 and/or link 122.

Figure 2:
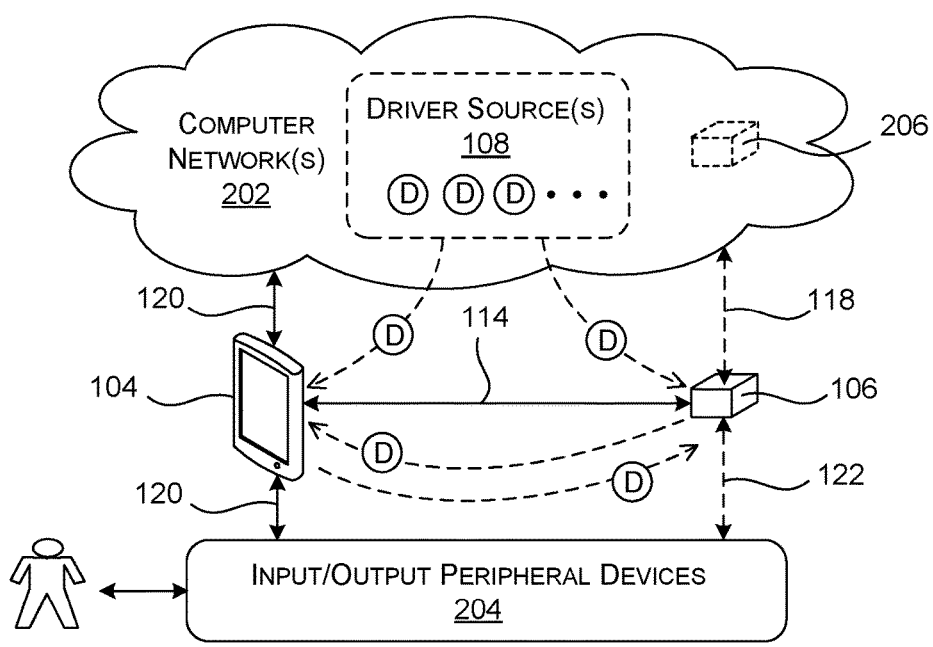
FIG. 2 shows one implementation of the system of FIG. 1.

FIG. 2 provides an overview of different ways that the client device 104 can obtain driver programs from the source 108, with or without the help of the assistant device. The source 108 is accessible via a computer network (or networks) 202. The end user interacts with the client device 104 using the peripheral device 204, either directly, or indirectly via the assistant device 106.

In a first implementation, the client device 104 directly downloads a driver program (D) without any assistant from the assistant device 106. The client device 104 stores the driver program in its CD driver store (not shown). In that case, the client device 104 can optionally also provide the client program to the assistant device 106 for storage in its AD driver store (not shown). In a second implementation, the client device 104 instructs the assistant device 106 to download the driver program from the source 108. The assistant device 106 does so and stores the driver program in its AD driver store. The assistant device 106 may optionally then forward the driver program to the client device 104, although this is not necessary because the client device 104 can rely on the assistant device 106 to install and execute the driver program. In a third implementation, the assistant device 106 can independently download a driver program without being prompted to do so by the client device 104. The assistant device 106 can then optionally forward the driver program to the client device 104 or can locally install and execute it.

FIG. 2 also shows that the client device 104 can optionally interact with a remote assistant device 206. For instance, the remote assistant device 206 may represent processing, storage and communication resources provided by a cloud-computing platform. The remote assistant device 206 can perform all of the functions to be described below with respect to the local assistant device 106. The user may "own" or otherwise control the remote assistant device 206 by establishing a user account with a provider which provides the cloud-computing platform. In other cases, the remote assistant device 206 refers to any device that is not within reach of the user at a current time, while interacting with the client device 104. For example, the remote assistant device 206 can correspond to a device that is located at a home location, whereas the user is currently interacting with the client device 104 in a work environment.

Figure 3:
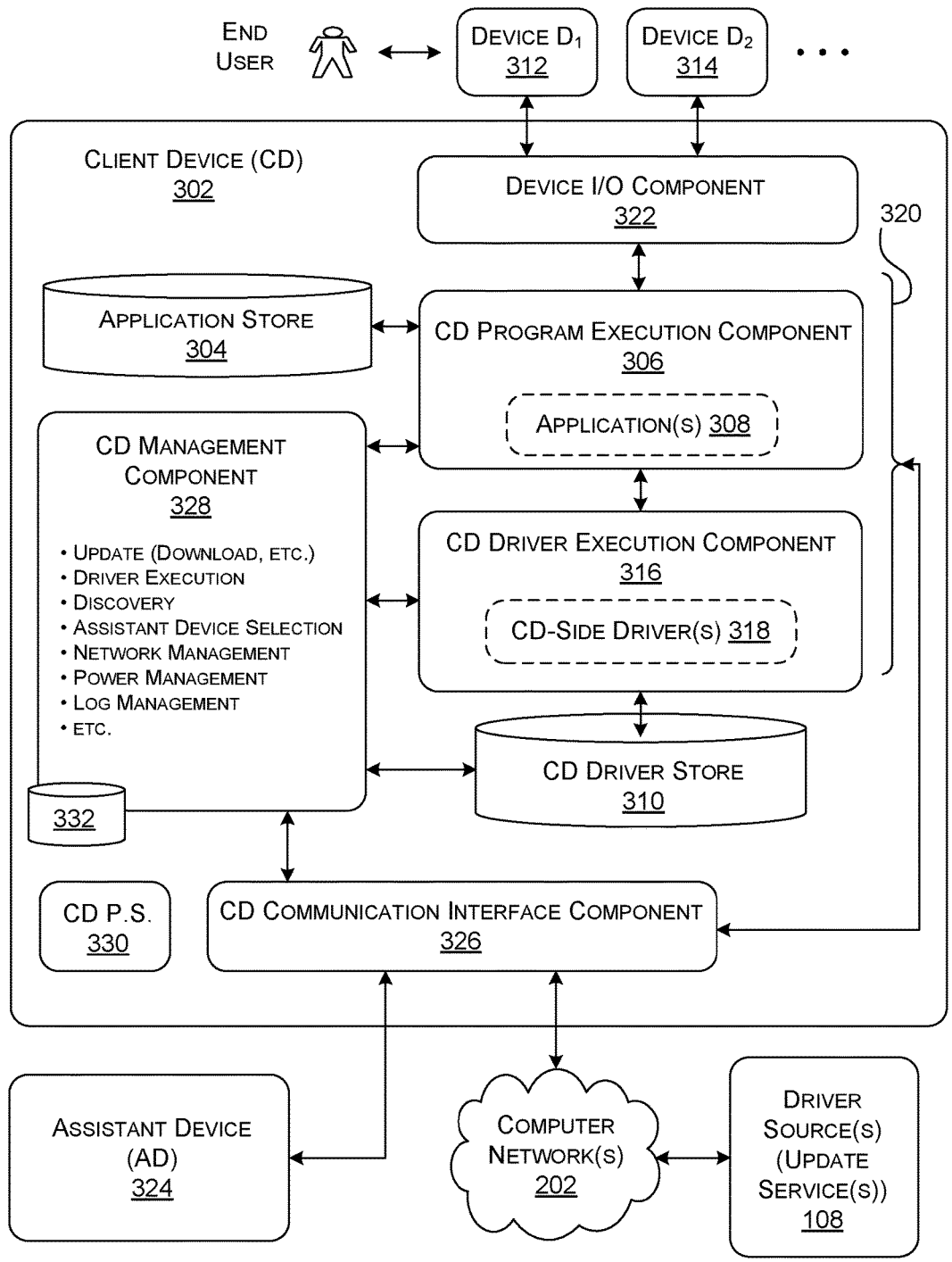
FIG. 3 shows one implementation of the client device shown in FIG. 1.

FIG. 3 shows one implementation of a client device 302, corresponding to an instantiation of the client device 104 introduced in the context of FIG. 1. The client device 302 can include a CD application store 304 which provides a collection of locally-stored applications. The client device 302 may interact with a collection of other applications (not shown) that are provided at other respective locations, e.g., at one or more network-accessible cloud computing sites (not shown). Further, any locally stored application can rely, in part, any remote resources. A CD program execution component 306 provides a runtime environment for executing applications 308.

A CD driver store 310 stores a collection of driver programs. Each driver program enables the client device 302 to interact with one or more peripheral devices and/or other components, such as peripheral devices (312, 314, . . . ). A CD driver execution component 316 provides a runtime environment for executing CD-side drivers 318.

Together, the CD program execution component 306 and the CD driver execution component 316 provide CD runtime functionality 320. The end user may interact with the CD runtime functionality 320 via a device I/O component 322. For example, the device I/O component 322 may provide a mechanism for receiving input signals from a USB cable, a wireless receiver, etc.

The client device 302 interacts with an assistant device 324 (corresponding to an instantiation of the assistant device 106 of FIG. 1) and the computer network 202 via a CD communication interface component 326. The CD communication interface component 326 can include any communication mechanism or combination of mechanisms, such as a serial interface mechanism, a network adapter mechanism, and so on.

A CD management component 328 manages different aspects of the operation of the client device 302. For example, the CD management component 328 can provide logic which controls: the manner in which the client device 302 updates its programs, including its driver programs; the manner in which the client device 302 executes its driver programs; the manner in which the client device 302 gains knowledge of the existence (and capabilities) of the assistant device 324 (and/or other available assistant devices); the manner in which the client device 302 chooses from among two or more candidate assistant devices (when, in fact, there are two or more candidate assistant devices to choose from among); the manner in which the client device 302 interacts with the computer network 202; the manner in which the client device 302 operates in relation to available power provided by a CD power source 330; the manner in which the client device 302 records information regarding its operation, and so on. Additional details regarding these functions are provided below.

The CD power source 330 can correspond to a rechargeable power source (e.g., a battery power source), a constant power source (e.g., an AC power interface, etc.), and so on. Alternatively, or in addition, the CD power source 330 may correspond to an interface through which the client device 302 receives power from the assistant device 324, and/or from some other electronic component or connection. For example, the client device 302 can receive power from the assistant device 324 via a link connecting the client device 302 to the assistant device 324, such as a USB link, Ethernet link, etc.

The CD management component 328 may provide one or more stores 332 which are used in carrying out one or more of the management functions described above. For example, the CD management component 328 can provide an update store for storing programs that it receives from the source 108. Further, the CD management component 328 can include an activity store for providing a history of connections established by the CD communication interface component 326, and/or other behavior by the client device 302.

Different client devices can implement the above-described components shown in FIG. 3 in different ways. For example, different architectures can allocate different components described above to user mode functionality and operating system functionality. In some implementations, for instance, the client device 302 implements at least the CD driver execution component 316 and the CD driver store 310 as resources of its operating system (OS).

With specific regard to the CD management component 328, FIG. 3 indicates that this component is implemented by the client device 302. That indeed represents one physical implementation. But in other cases, some functions associated with the CD management component 328 can be performed by one or more remote components, such as a remote management service implemented by one or more remote server computing devices. Hence, when this disclosure states that a client device 302 performs a particular function, that statement is to be liberally construed as an indication that the client device 302 governs the execution of that function, even though the client device 302 may not be the specific site at which the function is executed. The same is true with reference to functions performed by the assistant device 324.

The client device 302 may be physically implemented as any type of computing device having computing resources (e.g., one or more Central Processing Units (CPUs)), memory resources, communication resources, etc. To repeat, for instance, the client device 302 may correspond to a smartphone, a desktop personal computing device, a tablet-type computing device, a game console, etc.

Figure 4:
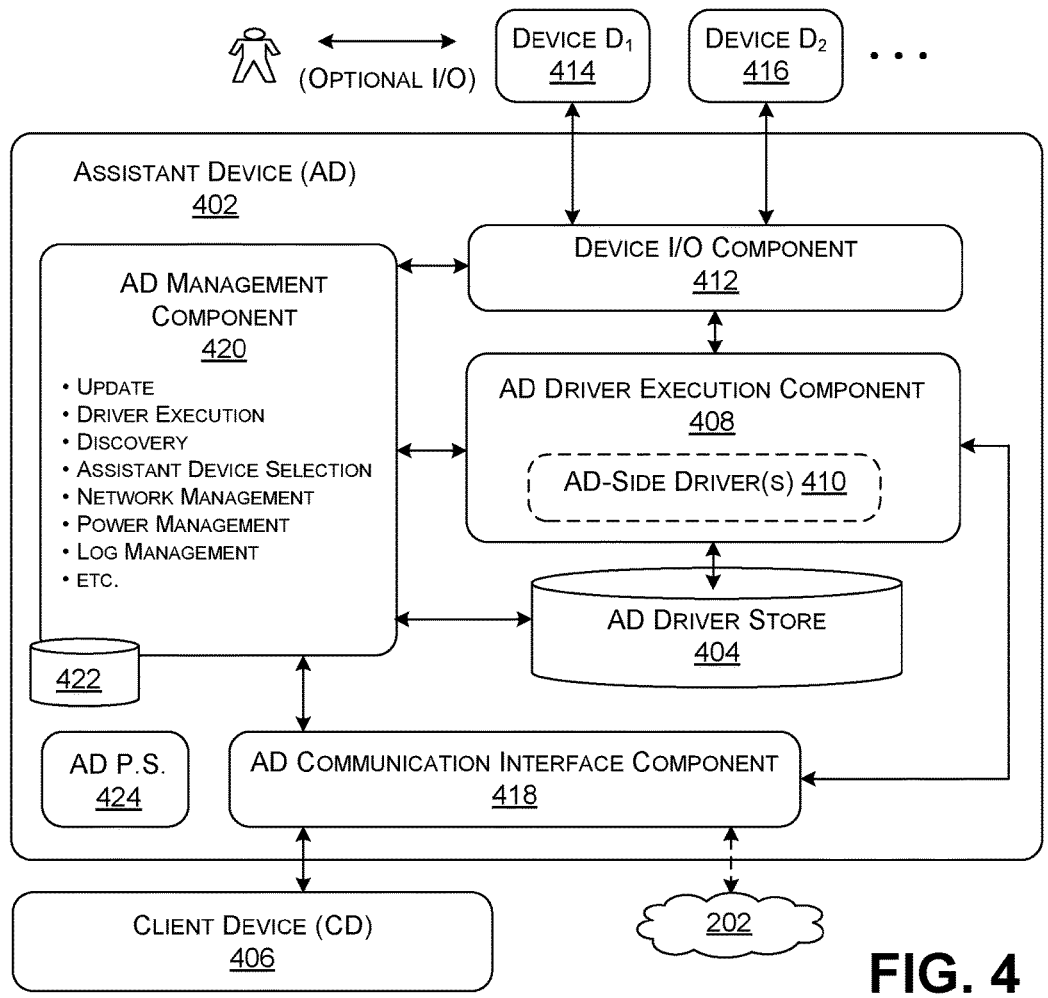
FIG. 4 shows one implementation of the assistant device shown in FIG. 1.

FIG. 4 shows one implementation of an assistant device 402 shown in FIG. 1, corresponding to an instantiation of the assistant device 106 of FIG. 1. In this implementation, the assistant device 402, includes an AD driver store 404 for storing AD-side driver programs. In addition, the assistant device 402 includes logic for operating on the AD-side driver programs and performing various management functions. For example, the assistant device 402 can include processing resources (CPUs and/or other processing logic), memory resources, communication resources, etc. Nevertheless, in some implementations, the assistant device 402 can utilize a reduced set of resources compared to a client device 406 (e.g., corresponding to an instantiation of the client device 104 of FIG. 1). For example, the assistant device 402 can incorporate an application-specific integrated circuit that allows it to download and/or execute driver programs, but may not allow it to execute other more general-purpose tasks which the client device 406 is capable of performing. Colloquially speaking, the assistant device 402 may be relatively "dumb" compared to the client device 406. In other implementations, the assistant device 402 has the same resources as the client device 406, or enhanced resources relative to the client device 406.

The assistant device 402 includes a collection of components which perform respective functions that parallel the same-named components of the client device 406 (described in FIG. 3). For example, the assistant device 402 includes an (optional) AD driver execution component 408 for running one or more AD-side drivers 410. The assistant device 402 includes a device I/O component 412 which (optionally) allows the end user to interact with the client device 406 (via the assistant device 402) using one or more peripheral devices (414, 416, ... ). The assistant device 402 includes an AD communication interface component 418 that communicatively couples the assistant device 402 to the client device 406 and (optionally) to the computer network 202. The AD communication interface component 418 can incorporate any communication mechanism or combination of mechanisms, such as a serial interface mechanism, a network adapter mechanism, and so on. The assistant device 402 further includes an AD management component 420 for performing various tasks summarized above, in conjunction with one or more data stores 422. One such complementary function entails exposing the assistant device's capabilities to the client device 406 (and/or other client devices, not shown). And finally, the assistant device 402 optionally includes an AD power source 424). The AD power source 424 can correspond to a rechargeable power source (e.g., a battery power source), a constant power source (e.g., an AC power interface, etc.), and so on. Alternatively, or in addition, the AD power source 424 may correspond to an interface through which the assistant device 402 receives power from the client device 406, and/or from some other electronic component or connection. For example, the assistant device 402 can receive power from the client device 406 via a link connecting the assistant device 402 to the client device 406, such as a USB link, Ethernet link, etc. Although not shown, other implementations of the assistant device 402 can incorporate additional components, such as an AD application data store and an AD program execution component for running the application programs.

Figure 5:
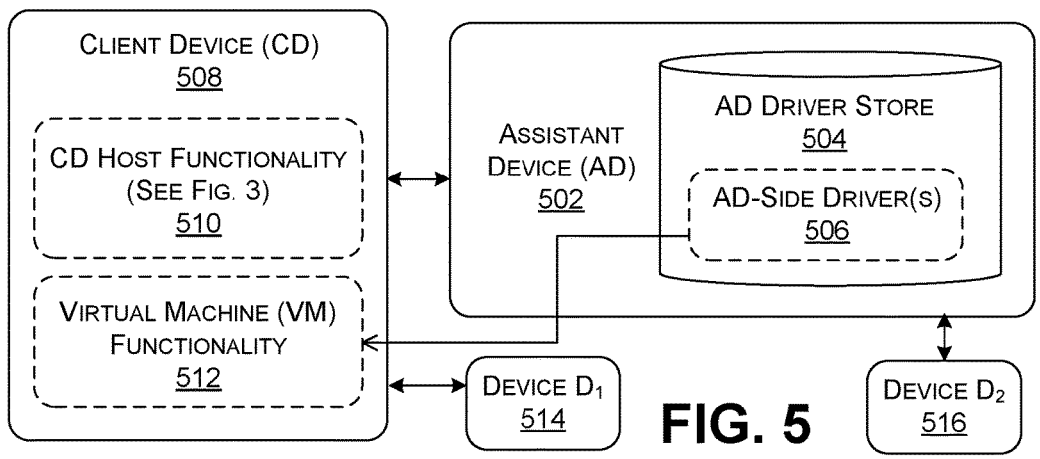
FIG. 5 shows another implementation of the assistant device shown in FIG. 1.

FIG. 5 shows an implementation of an assistant device 502 shown in FIG. 1, corresponding to another instantiation of the assistant device 106 of FIG. 1. In this implementation, the assistant device 502 includes, like the case of FIG. 4, an assistant device (AD) data store 504 that stores a collection of AD-side driver programs 506. But here, the assistant device 502 does not provide logic for running those programs (or for running other functions, including management functions). In one implementation, the kind of assistant device 502 shown in FIG. 5 can be located apart from a client device 508, e.g., as a component that is physically separate from the client device 508. But in another implementation, the assistant device 502 shown in FIG. 5 can represent an internal component of the client device 502 itself.

The client device 508 of FIG. 5 provides CD host functionality 510 and virtual machine (VM) functionality 512. The CD host functionality 510 can run all (or some) of the functions of the client device 302 described above with respect to FIG. 3. The VM functionality 512 can use any hardware-assisted virtualization mechanism to run all (or some) of the functions of the assistant device 402 described above with respect to FIG. 4. For instance, the VM functionality 512, when driven by the CD host functionality 510, can execute one or more of the driver programs. The VM functionality 512 receives the program code associated with the driver programs from the AD driver store 504 of the assistant device 502. The CD host functionality 510 interacts with the VM functionality 512 via a communication path that is the virtual analog of the communication link 114 shown in FIG. 2.

In some cases, the driver programs that run on the VM functionality 512 can drive peripheral devices that are directly coupled to the client device 508, such as the representative peripheral device 514. In other cases, the driver programs that run on the VM functionality 512 can drive peripheral devices that are directly coupled to the assistant device 502, such as representative peripheral device 516.

Known technology can be used to achieve hardware virtualization. With respect to x86 architectures, for instance, the VM functionality 512 can use HYPER-V functionality or the like provided by MICROSOFT CORPORATION of Redmond, Wash. to provide hardware-assisted virtualization. By virtue of the use of hardware-assisted virtualization, the VM functionality 512 provides a runtime environment that is isolated from the runtime environment of the CD host functionality 510, even though both the VM functionality 512 and the CD host functionality 510 ultimately draw from the same physical resources of the client device 508.

Figure 6:
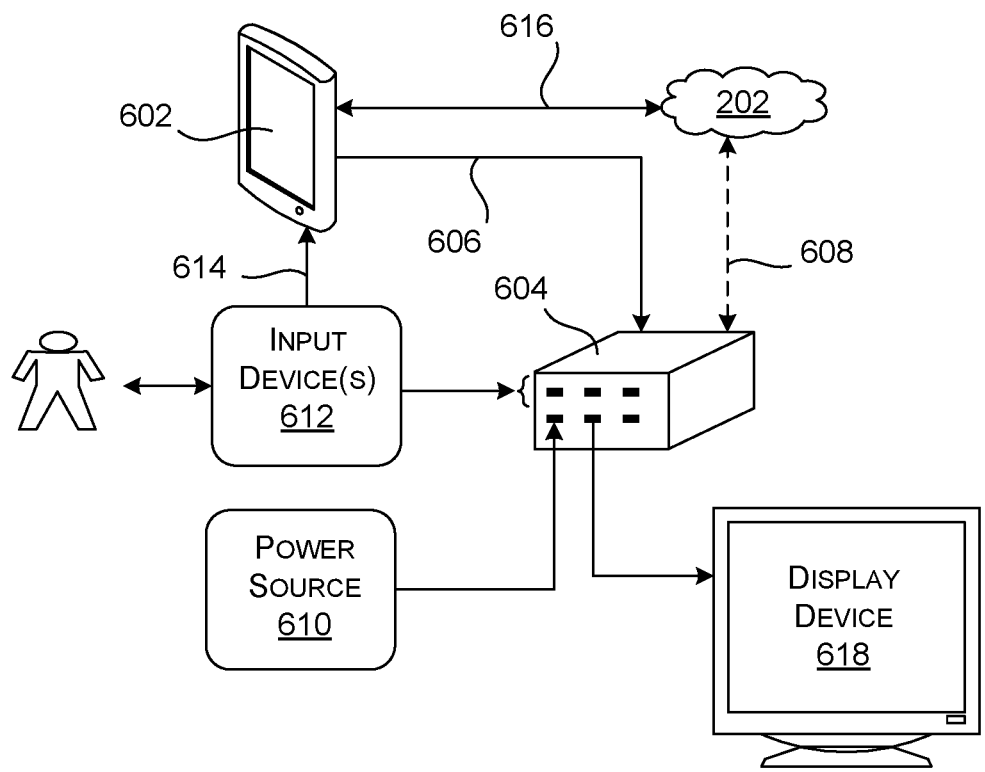
FIG. 6 shows another particular implementation of the system of FIG. 1, where, in this case, the assistant device also provides a display-docking function.

FIG. 6 shows another particular implementation of the system 102 of FIG. 1. In this case, a client device 602 (e.g., a smartphone) interacts with an assistant device 604 that performs two functions (where here, the client device 602 is an instantiation of the client device 104 introduced in FIG. 1, and the assistant device 604 is an instantiation of the assistant device 106 of FIG. 1). With respect to the first function, the assistant device 604 assists the client device 602 in downloading driver programs and/or performing other functions. To perform those operations, the assistant device 604 can include all of the components shown in FIG. 4 or 5. Further, the assistant device 604 is coupled to the client device via a communication link 606, and is coupled to the computer network 202 via the optional link 608. The assistant device 604 can optionally draw power from a power source 610. The client device 602 can be implemented using the architecture shown in FIG. 3. The client device 602 interacts with one or more input devices 612 via a link 614, or via input signals fed to it by the assistant device 604. The client device 602 interacts with the computer network 202 via a link 616.

As a second function, the assistant device 604 operates as a display dock. Here, the assistant device 604 routes output information that is generated by the client device 602 to a supplemental display device 618. In other words, the client device 602 normally presents its output information on its own display screen. In the case of FIG. 6, however, the assistant device 604 redirects the display information to the supplemental display device 618. The assistant device 604 also allows the user to interact with information (e.g., application information) that is presented on the supplemental display device 618 via input actions performed using the input devices 612.

The assistant device 604 can perform the above-referenced second function in different ways. In one approach, the assistant device 604 routes the output information provided by the client device 602 to the large display device 618, rather than (or in addition to) the display screen of the client device 602, without reformatting the output information. In other cases, a display agent can reformat the output information to suit the larger display area provided by the large display device 618. That agent can be located on the client device 602 or the assistant device 604, or a combination thereof. For instance, an application can receive a signal from the assistant device 604 that indicates that the user is routing output information to the large display device 618. In response, the application itself can format the output information in any application-specific manner to take advantage of the larger display space.

To consider a concrete case, a user may activate an application provided by the client device 602. The user may use the assistant device 604 to display output information that is generated by the application on the supplemental display device 618, instead of, or in addition to, the display screen of the client device 602 itself. The user may then proceed to interact with the application via whatever user interface presentation is projected onto the supplemental display device 618, using the input devices 612. The user may typically wish to interact with his or her application in the above-indicated manner because it is easier to interact with some applications via the supplemental display device 618 (which typically has a large display surface), compared to the client device 602 (which may have a much smaller display surface, e.g., corresponding to the touch-sensitive surface of a smartphone).

To be yet more specific, in one illustrative use case, the assistant device 604 may project a document on the display device 618 based on an execution process running on the client device 602. The end user may edit the document via a keyboard input device and/or a mouse input device, etc. Assume that a call arrives while the user is editing the document. The user may simultaneously interact with a voice application running on the client device 602 via a touch screen input device, etc. Moreover, the system of FIG. 6 can intelligently leverage the functionality shown in FIGS. 3 and 4 (for instance) to ensure that the client device 602 and the assistant device 604 have current driver programs for the peripheral devices with which they interact.

Figure 7:
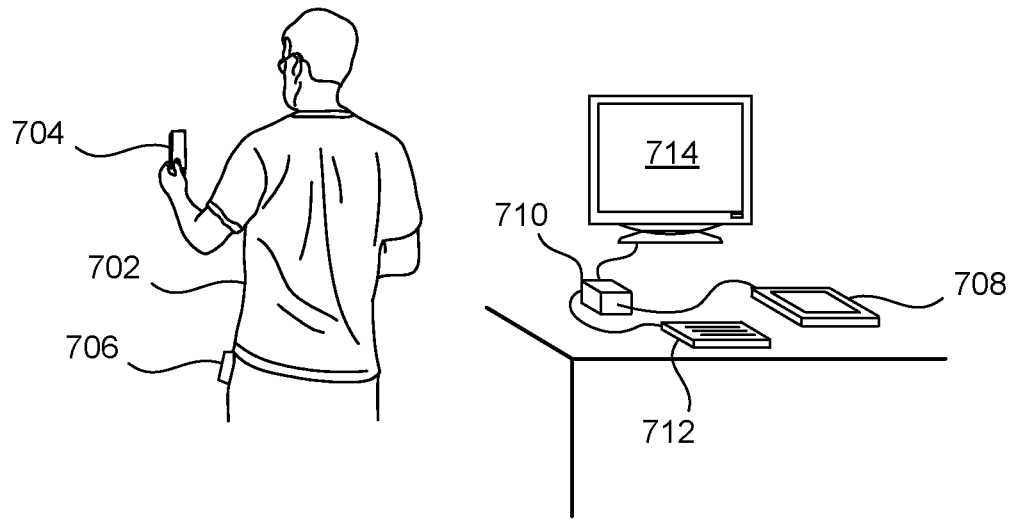
FIG. 7 shows another particular implementation of the system of FIG. 1. In one of the depicted scenarios in FIG. 7, the assistant device corresponds to a portable component that can be carried by (or that can otherwise accompany) a mobile user.

FIG. 7 shows another particular implementation of the system 102 of FIG. 1. In a first scenario, an end user 702 uses a portable client device 704 (e.g., a smartphone) to interact with a portable assistant device 706. The client device 704 is an instantiation of the client device 104 of FIG. 1, while the assistant device 706 is an instantiation of the assistant device 106 of FIG. 1. For instance, the portable assistant device 706 can be affixed to a belt holster (as shown in FIG. 7); alternatively, the portable assistant device 706 can be carried in a bag, affixed to a piece of clothing, and so on. The portable assistant device 706 can communicate with the client device 704 and (optionally) the computer network 202 via wireless communication mechanisms.

In a second scenario, the end user 702 uses a tablet client device 708 to interact with an assistant device 710. Here, both the client device 708 and the assistant device 710 rest on a desktop. The user 702 may optionally interact with the client device 708 via an input device 712 (e.g., a keyboard), and/or present output information generated by the client device 708 on a supplemental display device 714.

In a third scenario, the end user's portable client device 704 may interact with either the portable assistant device 706 or the desktop assistant device 710 based on one or more factors. For example, assume that the portable assistant device 706 is powered by a battery, while the desktop assistant device 710 has a continuous source of AC power. The client device 704 can continue to use the portable assistant device 706 until the user 702 comes within a prescribed distance of the desktop assistant device 710. Thereafter, the client device 704 will begin using the desktop assistant device 710 to conserve the limited power resources of the portable assistant device 706.

The client device 704 may determine its proximity to the assistant devices (706, 710) using any proximity-sensing mechanisms. For example, a Global Positioning System (GPS) mechanism can determine the positions of the assistant devices (706, 710) at any given time. The client device 704 can then compare its own position (which can be assessed using the GPS mechanism) with the positions of the assistant devices, enabling it to determine its location relative to these devices. In other cases, the client device 704 can use various relative position-determining mechanisms to assess its proximity to the assistant devices (706, 710). For example, the client device 704 can use a Near Field Communication (NFC) mechanism to determine when it is drawing close to one of the assistant devices (706, 710). Or the client device 704 can determine that it is close to one of the assistant devices (706, 710) when it determines that both the client device 704 and an assistant device are in proximity to a common wireless beacon (e.g., a Wi-Fi access point or a BLUETOOTH low energy beacon), and so on. Subsection A.5 provides additional details regarding scenarios that involve the use of two or more candidate assistant devices and/or two or more client devices.

Figure 8:
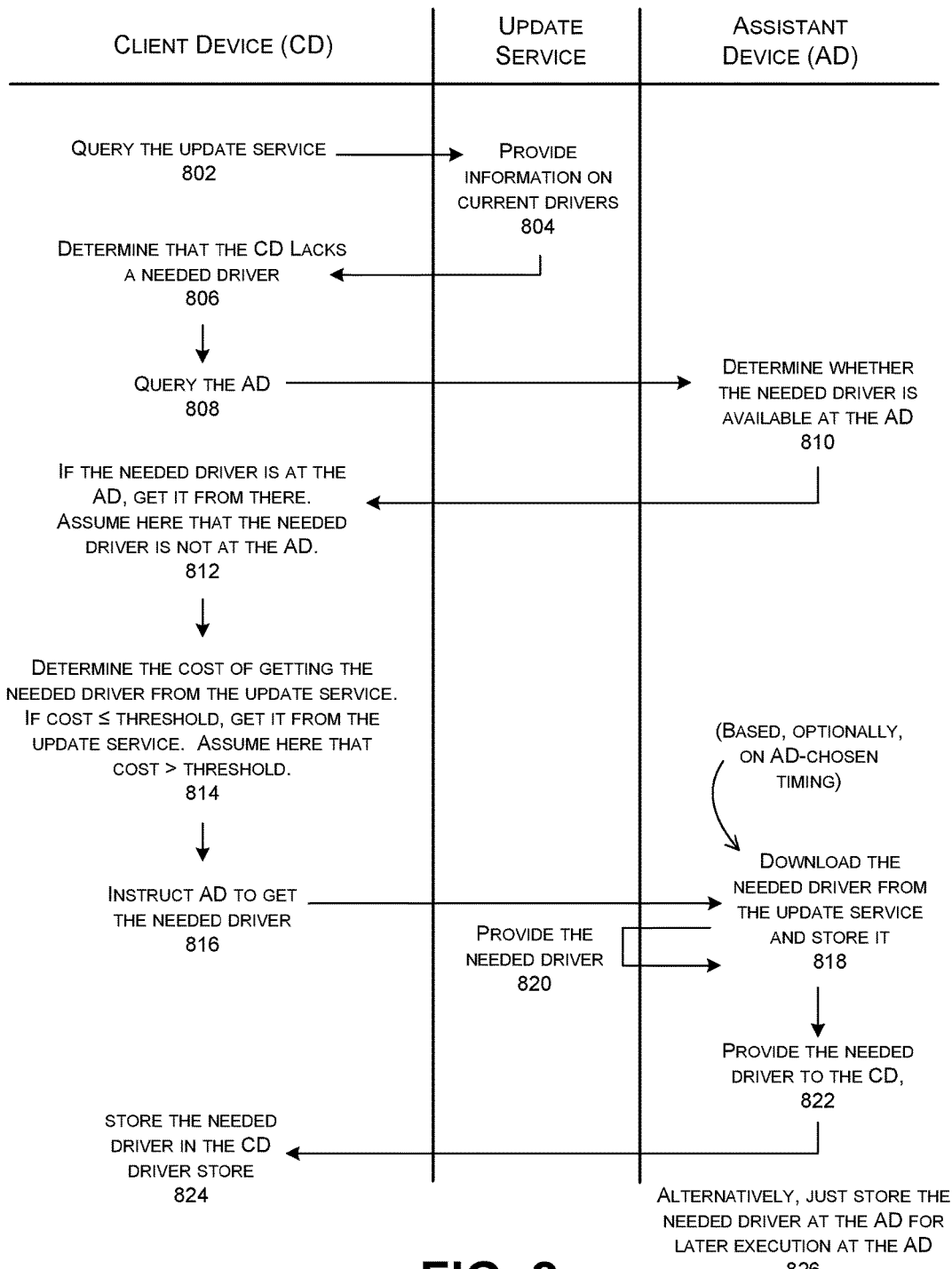
FIG. 8 shows a first illustrative action flow by which a client device and an assistant device can perform a program updating process.

FIG. 8 shows a first illustrative action flow of the system 102 of FIG. 1. The flow pertains to the case in which the client device 104 and the assistant device 106 cooperate to perform a program updating process, where the client device 104 and the assistant device 106 can be implemented in any of the ways set forth in FIGS. 3-7. More specifically, the interaction shown in FIG. 8 allows the client device 104 to obtain a driver program with the help of the assistant device 106. The client device 104 and the assistant device 106 perform the functions set forth below using the CD management component 328 and the AD management component 420, respectively.

The flow in FIG. 8 specifically corresponds to the case in which the client device 104 independently determines whether it its current collection of driver programs (provided in the CD driver store 310) is currently up-to-date, with respect the driver programs provided at the network-accessible source 108 (which are considered, by default, to be up-to-date). The client device 104 then takes steps to update its driver programs, if that is appropriate. To that end, in operation 802, the client device 104 first queries the update service (at the source 108). In operation 804, the update service provides information regarding its current driver programs, e.g., by identifying the version numbers of these driver programs. In operation 806, assume that the client device 104 determines, based on the information provided by the update service, that it lacks a current version of a driver program. That driver program is referred to as the "needed program" or "needed driver" below.

In operation 808, the client device 104 queries the assistant device 106 to determine whether the assistant device 106 contains the needed program in its AD driver store 404. In operation 810, the assistant device 106 answers the query. In operation 812, the client device 104 determines, based on information provided by the assistant device 106, that the assistant device 106 does not have the needed program. But if the assistant device 106 did have the needed program, the client device 104 would have asked it to download that needed program to the client device 104. At this juncture, the client device 104 concludes that it needs to obtain the needed program from the update service.

In an alternative implementation, not shown, the update service may proactively examine the CD driver store 310 of the client device 104, determine whether the client device 104 lacks a program, and notify the client device 104 that it should obtain the needed program.

In operation 814, the client device 104 calculates an estimated cost that would be incurred for it to obtain the needed program from the update service. To generate the cost, the client device 104 takes into account one or more factors. As one factor, the client device 104 determines the amount of time that would be required to download the program by the client device 104. That time, in turn, depends on the download rate at which the client device 104 can obtain information from a network-accessible source, together with the size of the needed program. As another factor, the client device 104 can take into consideration the extent to which the client device 104 is currently being used by the end user (or any other entity) to perform other functions. It is appropriate to consider these pre-existing (or planned) operations because the update process may interfere with these operations. As another factor, the client device 104 can take into consideration the battery level of the client device 104, or, more generally, the availability of power to the client device 104. It is appropriate to take power availability into consideration to ensure that the update process does not deplete the battery of the client device 104. As another factor, the client device 104 can take into consideration the security profile of the update service from which it is obtaining the needed program, or the security profile of the needed program itself. It is appropriate to take these security-related risks into account to weigh whether the client device 104 should be exposed to these risks. As another factor, the client device 104 can take into account the preferences of the individual user, as reflected in explicit preference information provided by the user in a profile, and activity patterns exhibited by the user (from which the preferences of the user can be inferred). It is appropriate to take the user's preferences into account to provide a better user experience to the user. As another factor, the client device 104 can take into account the current time of day, day of the week, etc. It may be appropriate to take this temporal information into account because it may be more appropriate to burden the client device 104 at certain times of day (and/or days of the week) compared to others. As another factor, the client device 104 can take into account any monetary costs and/or bandwidth constraints (and/or any other technical constraints) that may affect its ability to download a program over a candidate network connection, and so on. The above-identified factors are cited by way of example, not limitation; other implementations can take into consideration additional factors. Alternatively, or in addition, other implementations can omit one or more factors identified above.

Further note that the above-described factors principally take into consideration the ability of the client device 104 to perform a download operation. But in another case, the client device 104 also takes into consideration the ability of the assistant device to perform the download operation.

The CD management component 328 can generate the cost using any mechanism, such as by using one or more equations, rules (e.g., IF-THEN rules), algorithms, statistical machine-learned models (e.g., a linear regression model that accepts the above factors as input feature values), and so on, or any combination thereof. If the cost meets a first criterion (e.g., the cost is above a specified environment-specific threshold value Thresh), then the client device 104 can conclude that it is best to use the assistant device 106 to obtain the needed program. If the cost meets a second criterion (e.g., the cost is equal to or below the threshold value), then the client device 104 will download the needed program itself. Assume in this scenario that the cost is above the threshold, Thresh.

In yet another implementation, some agent other than the client device 104 can perform the above-described cost determination. For example, the assistant device 106, the update service or some other global management component can perform the cost determination, and then provide the cost value to the client device 104.

In operation 816, the client device 104 instructs the assistant device 106 to get the needed program. In operation 818, the assistant device 106 downloads the needed program from the source 108. In operation 820, the update service provides the needed program to the assistant device 106. In operation 822, the assistant device 106 provides the needed program to the client device 104. In operation 824, the client device 104 stores the needed driver program in the CD driver store 310. Alternatively, in operation 826, the assistant device 106 can refrain from forwarding the needed program to the client device 104; instead, the assistant device 106 can just store the needed program in its own AD driver store 404. The client device 104 may thereafter ask the assistant device 106 to run the needed program, rather than running it itself.

Referring again to operation 818, in a first implementation, the assistant device 106 can immediately respond to the request from the client device 104, e.g., by immediately downloading the needed program from the update service and sending it to the client device 104. In a second implementation, the assistant device 106 can first determine a most effective method to obtain the needed program, and then can obtain the needed program per the identified method. For example, the assistant device 106 can determine a time at which to obtain and forward the needed program. The assistant device 106 can make this determination based on one or more factors, such as: the current and projected workload of the client device 104 and the assistant device 106; the availability of power to the client device 104 and the assistant device 106; the current time of day and day of week; the explicit and inferred preferences of the end user, and so on. The assistant device 106 can use any one factor to make a decision or a combination of factors (e.g., using any equation, algorithm, rules-based system, statistical machine-trained model, etc. that generates a decision based on any combination of the above factors).

Figure 9:
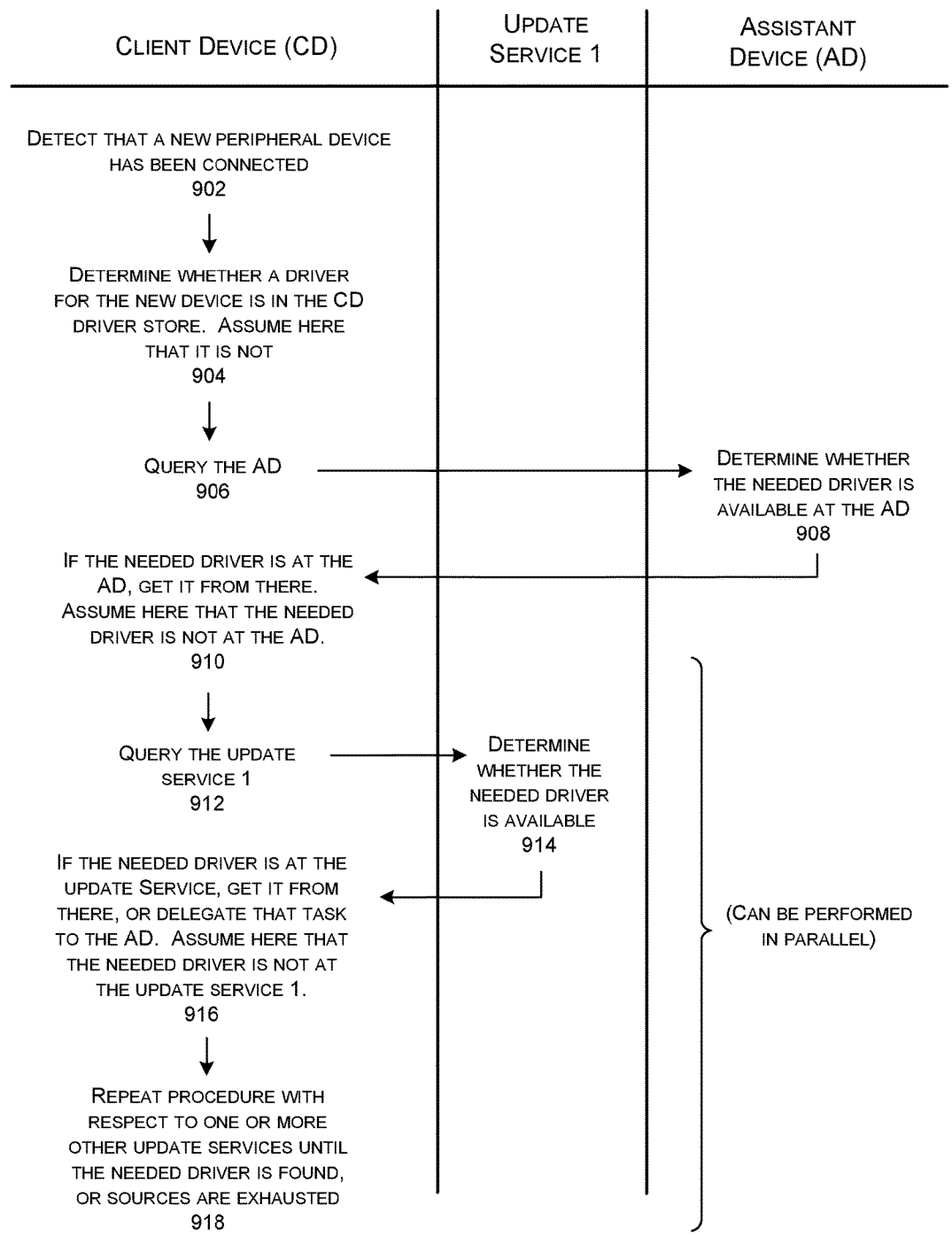
FIG. 9 shows a second illustrative action flow by which a client device and an assistant device can perform a program updating process.

FIG. 9 shows a second illustrative action flow by which the client device 104 and the assistant device 106 can perform a program updating process. Again, the client device 104 and the assistant device 106 perform the functions set forth below using the CD management component 328 and the AD management component 420, respectively.

In operation 902, the client device 104 (and/or the assistant device 106) detect that a new peripheral device or some other new component has been added to the system 102. For example, a user may plug a new keyboard into the assistant device 106, or couple a new mouse device to the client device 104 via wireless connection, etc. In operation 904, the client device 104 determines that it does not have a driver program that enables interaction with the new peripheral device or component. That driver program that is needed is again referred to as the "needed program" below. In operation 906, the client device 104 queries the assistant device 106 to determine whether the assistant device 106 includes that needed program in its AD driver store 404. In operation 908, the assistant device 106 performs a lookup operation to determine an answer to the client device's inquiry.

In operation 910, the client device 104 obtains the needed program from the assistant device 106 if the assistant device's answer indicates that it has it. Here, assume that the assistant device 106 does not have the needed program.

In operation 912, the client device 104 queries the update service to determine whether it has the needed program, and, in operation 914, the update service provides an answer. Assume that the update service does not contain the needed program.

Operation 916 indicates that, if the update service did in fact have the needed program (which it does not), the client device 104 would have obtained it from that source 108, either directly or indirectly (via the assistant device 106).

In operation 918, because the update service does not have the needed program, the client device 104 repeats the inquiry of operation 912 with respect to another update source. Generally, different update sources differ in one or more regards. They may be implemented by different administrative entities, they may be provided at different network-accessible sites, they may be accessible through different access mechanisms (e.g., through different network connections), and they may pose different respective security risks. The client device 104 repeats this inquiry until it finds an update source that has the needed program, or until all of its search options are exhausted. In another implementation, the client device 104 can search available update sources in parallel.

When the client device 104 does find an update service that provides the needed program, it downloads it in the manner described above with respect to FIG. 8. That is, the client device 104 calculates a cost of obtaining the needed program from the update service in the same manner described above with respect to FIG. 8. Based on the cost, the client device 104 either directly obtains the needed program from the update service, or asks the assistant device 106 to get it.

Figure 10:
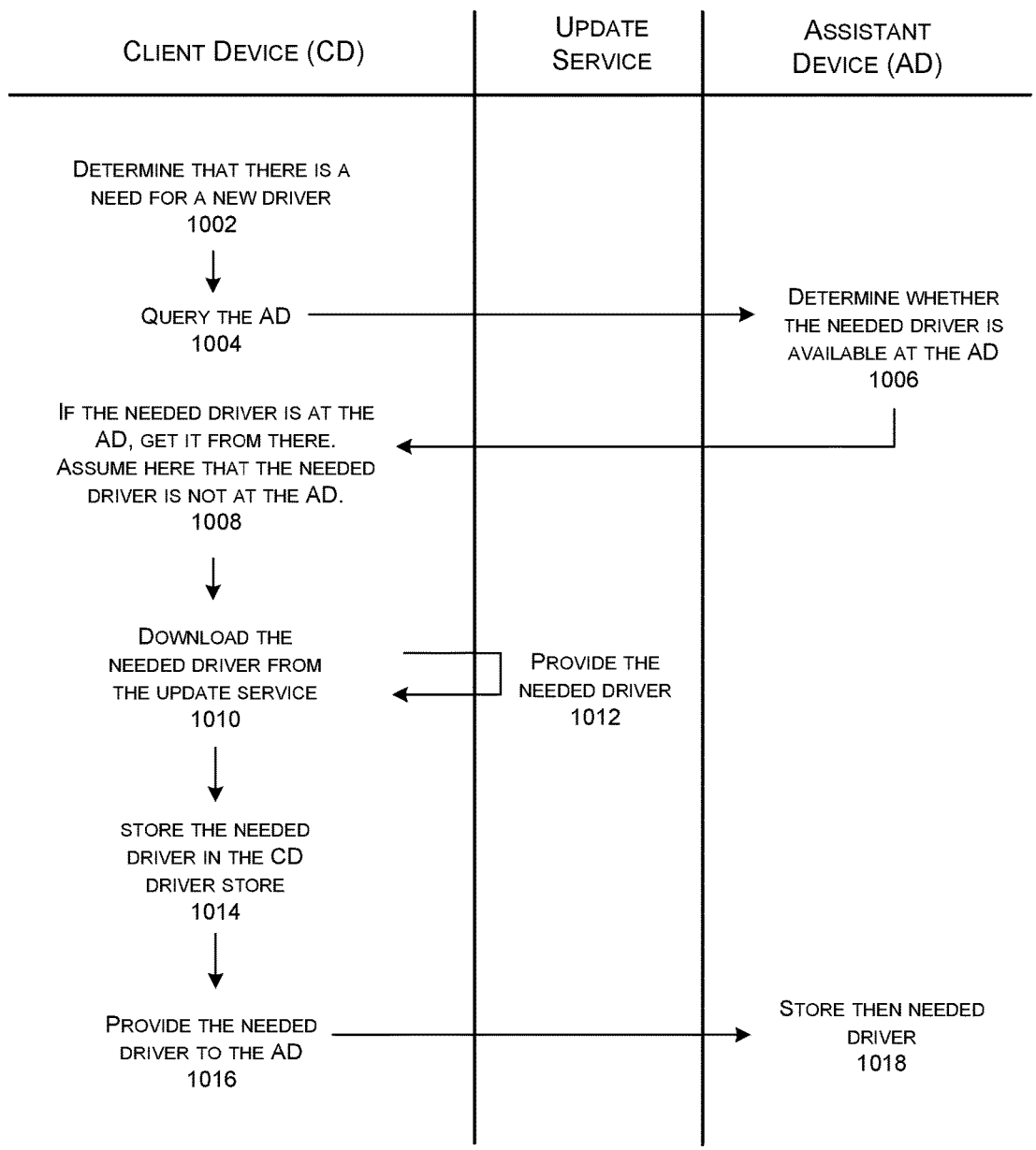
FIG. 10 shows a third illustrative action flow by which a client device and an assistant device can perform a program updating process.

FIG. 10 shows a third illustrative action flow by which the client device 104 and an assistant device 106 can perform a program updating process. This situation corresponds to the case in which the assistant device 106 is not available to download the needed program. For instance, this scenario may be appropriate for the implementation of the assistant device 106 shown in FIG. 4, where the assistant device 106 has an AD driver store 404, but no independent computation logic (e.g., no CPU, etc.).

In operation 1002, the client device 104 determines that it needs a program, e.g., because it has consulted the update service to determine that it lacks an up-to-date version of a driver in its CD driver store 310, or a new peripheral device has been plugged into the system 102 for which a driver program is lacking. In operation 1004, the client device 104 queries the assistant device 106 to determine whether it contains the needed program in its AD driver store 404. In operation 1006, the assistant device 106 answers the query. Operation 1008 indicates that client device 104 gets the needed program from the assistant device 106 if the assistant device has it; but, here, assume that the assistant device 106 does not have it.

In operation 1010, the client device 104 downloads the need program from the update service. In operation 1012, the update service provides the needed program. In operation 1014, the client device 104 stores the needed program in its CD driver store 310. In operation 1016, the client device 104 optionally transfers the need program to the assistant device 106. In operation 1018, the assistant device 106 stores the needed program in its AD driver store 404.

Figure 11:
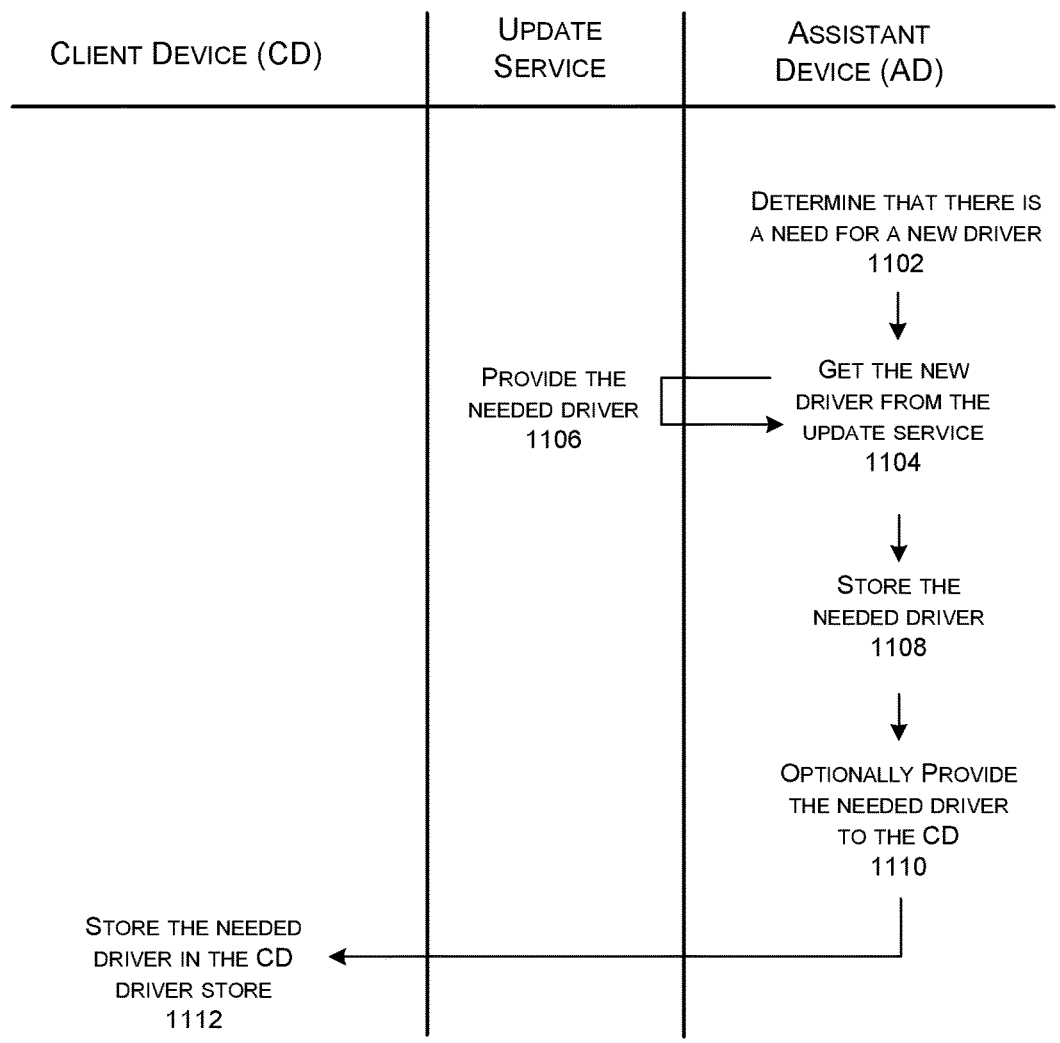
FIG. 11 shows a fourth illustrative action flow by which a client device and an assistant device can perform a program updating process.

FIG. 11 shows a fourth illustrative action flow by which the client device 104 and an assistant device 106 can perform a program updating process. This scenario specifically corresponds to the case which the assistant device 106 independently downloads a needed program, without being prompted to do so by the client device 104, as was the case for the scenarios of FIGS. 8 and 9. Again, the client device 104 and the assistant device 106 perform the functions set forth below using the CD management component 328 and the AD management component 420, respectively.

In operation 1102, the assistant device 106 determines that there is a need to obtain a new program. Although not shown, the assistant device 106 can make this conclusion by consulting the update service, which it may do on a periodic and/or event-driven basis. In operation 1104, the assistant device 106 obtains the new program from the update service. In operation 1106, the update service provides the needed program. In operation 1108, the assistant device 106 stores the needed program in its AD driver store 404. In operation 1110, the assistant device 106 optionally forwards the needed program to the client device 104. In operation 1112, the client device 104 receives the needed program and stores it in its CD driver store 310.

In a variation of the flow of FIG. 11, the assistant device 106 can generate a cost value to determine whether it is more appropriate for the client device 104 to perform the downloading operation, rather than the assistant device 106. For example, the assistant device 106 may determine that the client device 104 is currently idle (e.g., because it is the middle of the night when the user rarely uses his or her device). The assistant device 106 may allocate the downloading task to the client device 104 to free the assistant device 106 to perform other tasks that it may have scheduled, and/or for power-related reasons (e.g., because the client device 104 has a constant source of power whereas the assistant device 106 does not). The assistant device 106 can compute such a cost value using any of the factors and techniques described above with respect to FIG. 8 (with respect to the calculations performed by the client device 104).

Overall, the assistant device 106 reduces the burden placed on the limited resources of the client device 104 when performing an update process or network connection task (or any other task involving interaction with the computer network 202). This effect, in turn, may result in improved performance of the client device 104, together with a good user experience. The system 102 can also leverage the assistant device 106 to reduce security-related risk(s) associated with a download operation, e.g., by allocating a risky download operation to the assistant device 106.

More specifically, consider the particular scenario in which a technological environment may host thousands of driver programs, many of which are updated on a frequent basis. The client device 104 may have insufficient processing, storage, and/or communication resources to obtain, maintain and run all of these programs. The client device 104 can leverage one or more assistant devices to distribute the burden of obtaining and running these driver programs.

A.3. Executing Drivers and Other Programs Using an Assistant Device

This subsection sets forth various ways that the system 102 of FIG. 1 can execute a program using the resources of a client device and an assistant device. To facilitate explanation, the program that is executed will be described in the context of a driver program. A driver program allows a client device to interact with some peripheral device or other component, e.g., by receiving input information from an input device and/or providing output information to some output device. But the principles described herein can be applied to the execution of other programs.

More generally, this subsection makes reference to client devices, assistant devices, and various subcomponents thereof. These devices and subcomponents may correspond to instantiations of the same-named devices and components mentioned in the previous subsection.

Figure 12:
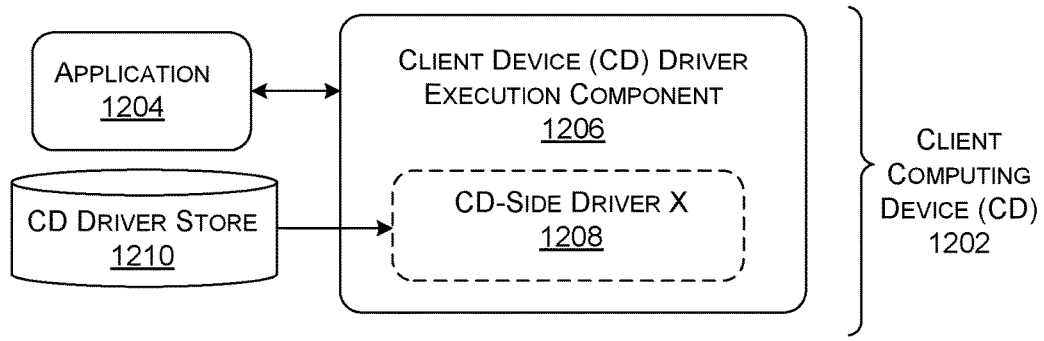
FIG. 12 shows a first implementation by which a client device executes a program, such as a driver program.

FIG. 12 shows a first mechanism by which a client device 1202 executes a driver program. Here, an application 1204 interacts with at least one peripheral device or other component (not shown) in the course of performing its functions. To enable this interaction, a CD driver execution component 1206 loads a CD-side driver X 1208 from a CD driver store 1210 and executes it. Further, the CD driver execution component 1206 performs this task without any involvement from an assistant device. In other words, the client device 1202 operates here in a traditional manner by using a stored driver program to interact with a connected peripheral device.

Figure 13:
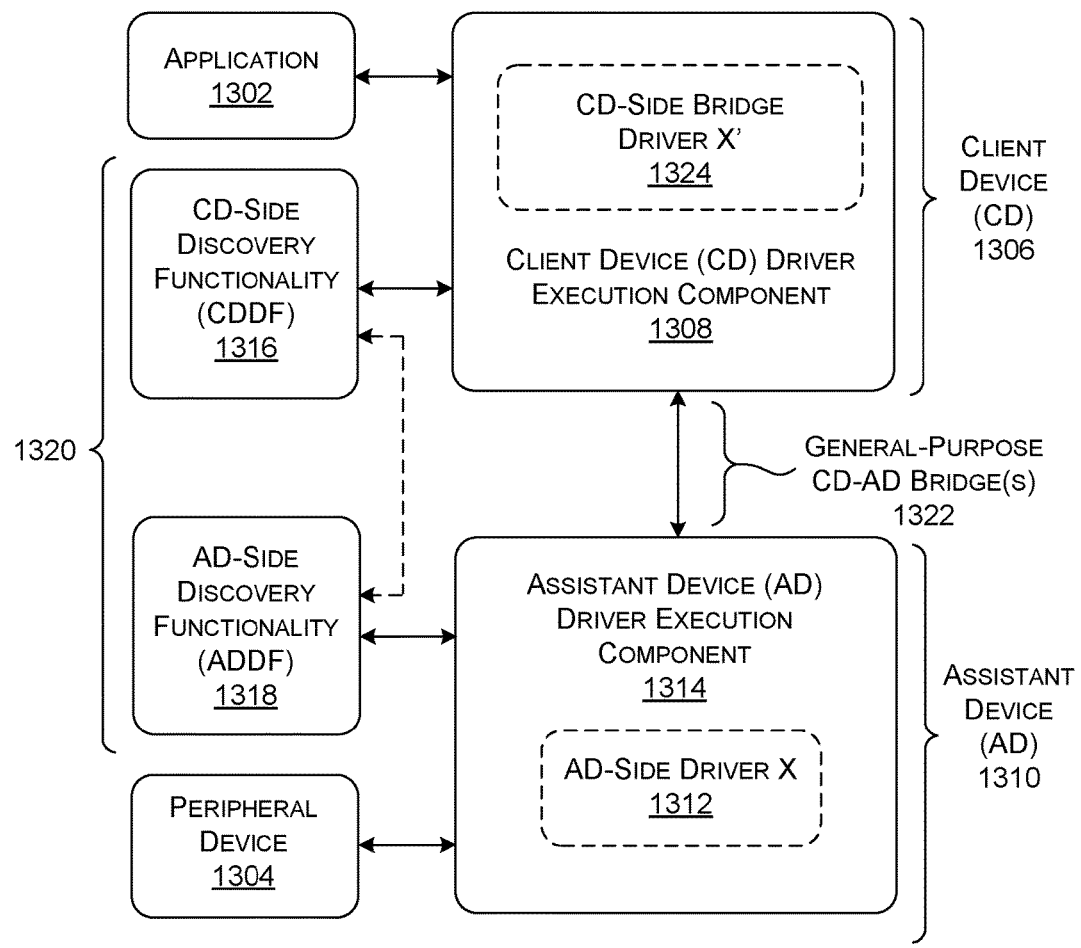
FIG. 13 shows a second implementation by which a client device, with the aid of an assistant device, executes a driver program.

FIG. 13 shows a second mechanism for executing a driver program. Here, an application 1302 interacts with a peripheral device 1304 or other component in the course of performing its functions. A client device 1306 can interact with the peripheral device 1304 in two ways. In a first technique, assume that the CD driver store (of the client device 1306) does not initially provide the required driver program (e.g., a CD-side driver X), but an AD driver store does have this program. To address this deficiency, a CD driver execution component 1308 can load the driver X from the AD driver store of a corresponding assistant device 1310, and then execute it in the client device runtime environment.

In a second technique, the client device 1306 uses an AD-side driver X 1312, provided by an AD driver execution component 1314, to interact with the peripheral device 1304, e.g., without transferring that driver X program to the client device 1306. Assume here that the AD driver execution component 1314 obtains the AD-side driver X 1312 from the AD driver store of the assistant device 1310.

The second technique is explained below with reference to three component processes. As a first process, the client device 1306 discovers what assistant devices are available (if any), and the capabilities of these assistant device(s). As a second process, the client device 1306 decides whether it is more appropriate to run a driver program in the client device 1306 or the assistant device 1310. In a third process, the client device 1306 and the assistant device 1310 cooperate to carry out the running of the driver program (e.g., the AD-side driver X 1312) at the assistant device 1310, presuming that a decision is made to run it there.

As to the first process, CD-side discovery functionality (CDDF) 1316 can discover the existence and capabilities of the assistant device 1310 (and/or other assistant devices, not shown) by interacting with AD-side discovery functionality (ADDF) 1318. The CDDF 1316 and the ADDF 1318 can be implemented by any particular component(s) of the client device 1306 and the assistant device 1310, respectively. For instance, FIGS. 3 and 4 describe these functions as implemented by the CD and AD management components (328, 420). Collectively, the CDDF 1316 and the ADDF 1318 constitute discovery functionality 1320.

The CDDF 1316 can use different approaches to discover the existence and capabilities of the assistant device 1310. In a first approach, the CDDF 1316 learns of the existence and capabilities of the assistant device 1310 as a result of the client device 1306 being coupled to the assistant device 1310 at the current time and/or on a previous occasion. For example, assume that a user manually couples the client device 1306 to the assistant device 1310 via a USB connection. As a result of this connection, the CDDF 1316 can interact with the ADDF 1318 to determine the driver programs provided by the assistant device 1310, the peripheral devices (if any) connected to (or otherwise associated with) the assistant device 1310, and so on. The ADDF 1318 can also keep the CDDF 1316 apprised of any changes to its driver programs and peripheral devices, etc. For example, the ADDF 1318 can notify the CDDF 1316 when any new peripheral device is connected (or removed) from the assistant device 1310. The ADDF 1318 can describe an asset (e.g., a driver program, peripheral device, service, network, etc.) in any level detail. For example, the ADDF 1318 can describe the technical capabilities of an asset (e.g., by indicating whether a printer device has color-printing capabilities), the reliability of an asset, the security associated with an asset, and so on In a second approach, the ADDF 1318 uses a broadcast protocol to inform the CDDF 1316 of its existence and its capabilities (e.g., by identifying the driver programs that it hosts). For instance, the ADDF 1318 can emit such broadcast information on a periodic basis and/or on an event-driven basis (e.g., when its collection of driver programs and/or peripheral devices changes). Upon receiving such a broadcast signal, the CDDF 1316 can update a locally-stored table that identifies the assets that are currently available to it. Then, when an asset is needed, the CDDF 1316 can consult its local table to determine the subset of assistant devices from which it may choose.

In a third approach, the ADDF 1318 can provide information to one or more global directories (provided at one or more server computing devices) which describes its assets. When the client device 1306 needs an asset, it consults such a global directory.

Assuming that the client device 1306 is aware of the pool of assistant devices that is available to it, the client device 1306 next decides whether it is more appropriate to execute a driver program using the client device 1306 or a particular assistant device. Assume in this introductory example that there is only one assistant device 1310 that is identified; hence, the client device 1306 determines whether it is more appropriate to run the AD-side driver X 1312 in the AD driver execution component 1314 or the CD driver execution component 1308. Assume that the client device 1306 concludes that the former option is more appropriate.

Different agents provided by the client device 1306 and/or the assistant device 1310 can play a role in the above decision. In one implementation, a CD management component (e.g., the CD management component 328 of FIG. 3) determines that the driver program (AD-side driver X 3012 is to be executed by the AD driver execution component 1314. In another implementation, an AD management component (e.g., the AD management component 420 of FIG. 4) makes this determination. In another implementation, the CD management component and the AD management component cooperatively make this decision. Generally, the component(s) that make this decision is/are referred to as allocation functionality below.

In any event, the allocation functionality can make the decision based on one or more factors. First, the allocation functionality can determine that it is appropriate to run the driver program at the assistant device 1310 because the CD driver store lacks the driver program.

Second, the allocation functionality can determine that it appropriate to run the driver program at the assistant device 1310 based on compatibility-related factors. For example, the allocation functionality can determine that it is appropriate to run the driver program at the assistant device 1310 because the driver program is based on an instruction set that is not compatible with the instruction set of the client device 1306.

Third, the allocation functionality can determine that it is appropriate for the assistant device 1310 to execute the driver program because the driver program is assessed as posing a security risk. The driver program may be determined to pose a security risk, in turn, because it has been obtained from a source that is considered to pose a security risk, and/or it was obtained via an access mode that is considered to pose a security risk. Alternatively, or in addition, the allocation functionality may perform independent analysis on the driver program (using a threat detection component, not shown in FIG. 13) to determine that the driver program poses a security risk (e.g., because it requires access rights that may jeopardize the resources of the client device 1306).

Fourth, the allocation functionality can determine that it is appropriate to run the driver program at the assistant device 1310 based on any combination of various other contextual factors, including, but not limited to: the current (and scheduled) workloads of the client device 1306 and the assistant device 1310; the current time of day and day of the week; the power available to the client device 1306 and the assistant device 1310; the processing resources, memory resources, communication resources, etc. available to the client device 1306 and the assistant device 1310; the explicit and inferred preferences of the user, and so on.

In some cases, the allocation functionality can decide to execute the driver program at the assistant device 1310 in whole or in part based on any one of the above-noted factors. In other cases, the allocation functionality can use any equation, algorithm, rules-based system, statistical machine-trained model, etc., or any combination thereof, to make the decision.

Once invoked, the AD driver execution component 1314 can run the AD-side driver X 1312 to generate a driver output result. More specifically, the peripheral device 1304 can act as an input device or an output device (or both). When the peripheral device 1304 operates as an input device, the AD-side driver X 1312 receives peripheral-in-information from the peripheral device 1304. It processes the peripheral-in-information to generate a driver output result. The AD driver execution component 1314 can route the driver output result back to the CD driver execution component 1308, which, in turn, can provide the driver output result to the application 1302 and/or any other appropriate recipients. When the peripheral device 1304 operates as an output device, the AD-side driver X 1312 can receive peripheral-out-information, e.g., as provided by the application 1302. The AD-side driver X 1312 processes the peripheral-out-information to generate a driver output result. The AD driver execution component 1314 provides the driver output result to the peripheral device 1304.

In some implementations, the client device 1306 interacts with the assistant device 1310 via a general-purpose client-device-assistant-device (CD-AD) bridge 1322. The general-purpose CD-AD bridge 1322 transfers peripheral information to and from the AD driver execution component 1314. In connection therewith, the CD driver execution component 1308 may use a CD-side bridge driver X' 1324. The client device 1306 uses the bridge driver X' 1324 to enable interaction with the assistant device 1310, effectively treating the assistant device 1310 as a peripheral device. Although not shown, the assistant device 1310 can include an AD-side bridge driver to enable interaction with the client device 1306, effectively treating the client device 1306 as a peripheral device. Together, the bridge drivers implement the general-purpose CD-AD bridge 1322.

The CD-AD bridge 1322 can be said to be general-purpose or protocol-independent because it uses a uniform protocol regardless of the particular nature of the function performed by the AD-side driver X 1312. In other words, the client device 1306 transfers peripheral information back and forth between the assistant device 1310 using the uniform protocol, without needing to handle the complexity of the operations performed by the AD-side driver X 1312 running on the AD driver execution component 1314.

Figure 14:
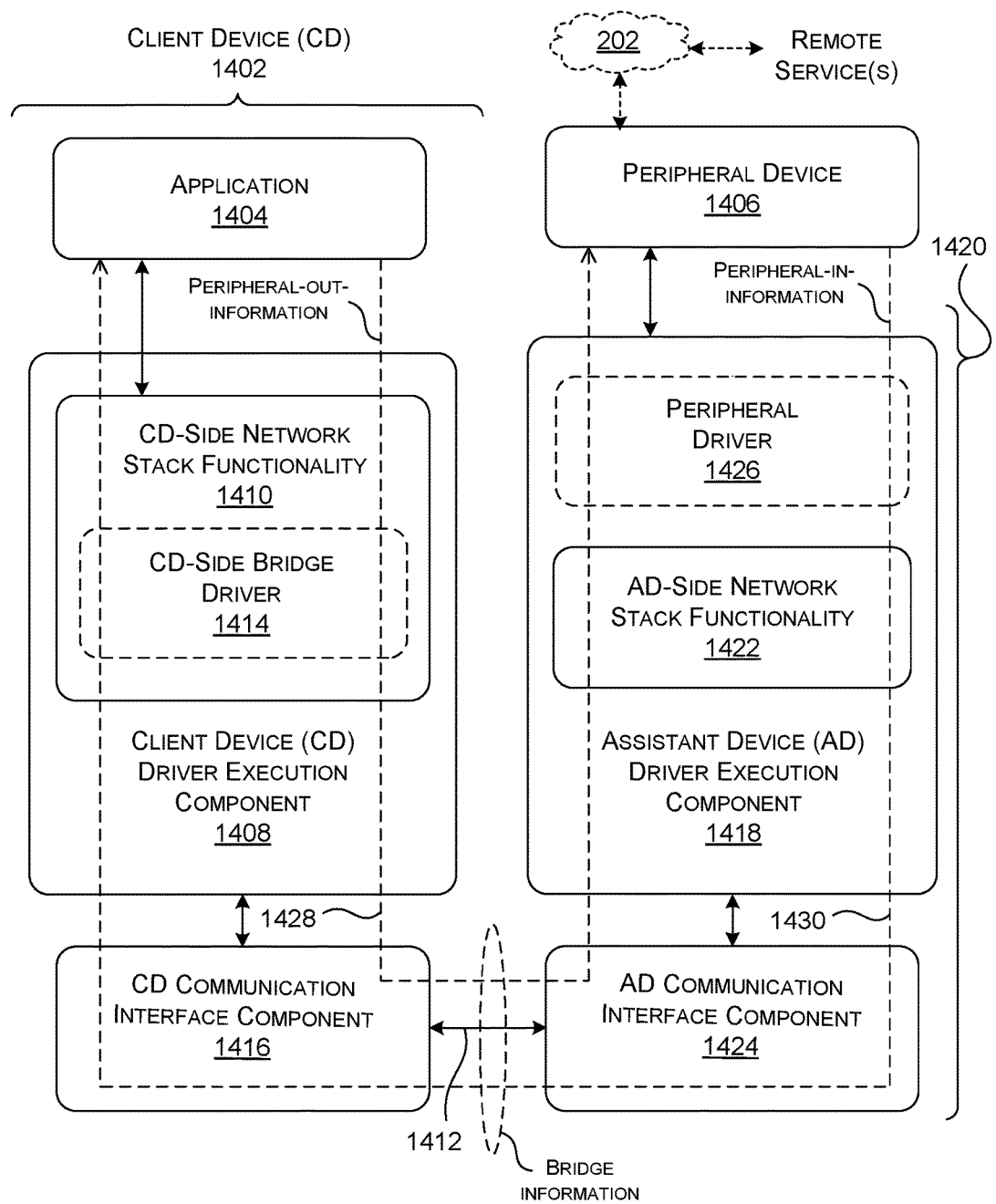
FIG. 14 shows a third implementation by which a client device and an assistant device execute a driver program, corresponding to one instantiation of the implementation of FIG. 13.

In one implementation, the CD-side bridge driver X' 1324 achieves the above-noted independence by operating as a class driver. This class driver provides a general-purpose transport and control protocol for exchanging peripheral information regarding a specified class of peripheral devices. In other cases, the CD driver execution component 1308 can choose an appropriate class driver from a collection of class drivers (not shown), depending on the particular type of peripheral device 1304 that is being controlled. Each class driver may produce a different general-purpose bridge, each capable of exchanging peripheral information regarding a specified class of peripheral devices. As another strategy, the CD-AD bridge 1322 uses one or more drivers to achieve a degree of isolation and abstraction by encapsulating or "wrapping" peripheral information via a higher-order protocol. FIG. 14 (below) describes such a strategy in greater detail.

In addition, in some cases, the CD-AD bridge 1322 can operate in an enhanced-security mode by excluding the exchange of certain content flowing from the assistant device 1318 to client device 1306 (and optionally in the opposite direction too). For example, the CD-side bridge driver X' 1324 can extract executable content and other control content from the driver output information, while passing along the data payload portion of the display output information. This provision helps ensure that the execution of the AD-side driver X 1308 will not harm the resources of the client device 104.

As a further security-related feature, the CD-AD bridge 1322 can use isolation to ensure that data received from the assistant device 1310 does not involve interaction with the kernel operating system (OS) resources of the client device 1306. More specifically, in one traditional technique, a client device processes data from a peripheral device using the client device's kernel resources, e.g., in the course of performing computation on the data, direct memory access (DMA), etc. Here, the CD-AD bridge 1322 overrides these operations, and passes the data directly to the application 1302. The client device 1306 can achieve isolation in different ways, such as by using technique described below with reference to FIG. 14.

FIG. 14 shows one implementation of the principles set forth with respect to FIG. 13. Here, a client device 1402 hosts an application 1404 which interacts with a peripheral device 1406. In the particular example of FIG. 14, the peripheral device 1406 may correspond to a network interface card which interacts with the computer network 202, e.g., for the purpose of interacting with a remote service hosted on a remote server computing device. In other cases, however, the peripheral device 1406 can correspond to any input and/or output device, such as a keyboard, mouse device, printer, etc.

A CD driver execution component 1408 includes CD-side network stack functionality 1410. The CD-side network stack functionality 1410 processes peripheral information for transmission over, or receipt by, a general-purpose client-device-assistant-device (CD-AD) bridge 1412. In connection therewith, the CD-side stack functionality 1410 employs a CD-side driver 1414 which drives a CD communication interface component 1416. Similarly, an AD driver execution component 1418 of an assistant device 1420 includes AD-side network stack functionality 1422. Although not shown, the AD-side network stack functionality 1422 includes an AD-side bridge driver which drives an AD communication interface component 1424. The AD driver execution component 1418 also includes a peripheral driver 1426 for driving the peripheral device 1406.

FIG. 14 outlines two paths (1428, 1430). The first path 1428 routes peripheral information from the application 1404 (or some other process on the client device 1402) to the peripheral device 1406. The second path 1430 routes peripheral information from the peripheral device 1406 to the application 1404 (or some other consuming process).

With respect to path 1428, consider the particular example in which the application 1404 seeks to query some remote service via the computer network 202. The application 1404 calls network APIs hosted in the CD-side network stack functionality 1410. The CD-side network stack functionality 1410 interfaces with its CD-side discovery functionality (CDDF) (e.g., see FIG. 13) to identify the capabilities of the assistant device 1420. Through this process, it identifies that the AD driver execution component 1418 hosts the peripheral driver 1426, and that the assistant device 1420 is coupled to the peripheral device 1406. The CD-side bridge driver 1414 then connects to the AD driver execution component 1418. When this connection channel has been established, the CD-side network stack functionality 1410 encapsulates the peripheral information (that is destined for the peripheral driver 1426) into TCP/IP (Transmission Control Protocol/Internet Protocol) packets (or information units associated with some other standard), and sends those packets to the AD-side network stack functionality 1422. The AD-side network stack functionality 1422 then transmits the application's network request to the computer network 202 to get information from a server (not shown). This transmission uses the peripheral driver 1426 and the peripheral device 1406.

Assume next that the remote service responds to the application's request, e.g., by sending network packets to the assistant device 1420. The AD-side network stack functionality 1422 uses the peripheral device 1406 and the peripheral driver 1426 to listen for and receive the response. When the response is received, the AD-side network stack functionality 1422 identifies the CD-side network stack functionality 1410 as the destination and forwards the response to it via the AD communication interface component 1424 and the CD communication interface component 1416. The CD-side network stack functionality 1410 performs the opposite operation to that described above when receiving TCP/IP packets from the general-purpose CD-AD bridge 1412. In summary, in the above interaction, the client device 1402 treats the AD driver execution component 1418 as a next "hop" when it seeks to interact with a service via the computer network 202.

With respect to path 1430, assume that the remote service independently sends peripheral-in-information to the application 1404. The assistant device 1420 handles this interaction in the same manner described immediately above. More generally, any operation described as being performed by the CD-side network stack functionality 1410 has a complementary operation that can be performed on the AD-side network stack functionality 1422.

In some implementations, the AD-side network stack functionality 1422 can expose external entities to the address space associated with the client device 1402, e.g., via the computer network 202. In other cases, the AD-side network stack functionality 1422 can hide the client device's address space from external entities. In that latter case, the AD-side network stack functionality 1422 can use network address translation (NAT) to translate messages pertaining to its own address space to the address space associated with the client device 1402.

As noted above, the example of FIG. 14, while described in the context of interaction with a network-accessible entity (e.g., a remote service), is not limited to that example. In another case, the client device 1402 leverages the assistant device 1420 to store and retrieve files from a data store. In connection therewith, the CD driver execution component 1408 can operate as a File Transfer Protocol (FTP) client and/or a Server Message Block (SMB) client, and the AD driver execution component 1418 can operate as an FTP server and/or an SMB server. In another case, the client device 1402 leverages the assistant device 1420 for the purpose of interacting with a print server. In general, the CD driver execution component 1408 operates as an agent to handle whatever application programming interfaces (APIs) are being called by the application 1404. These APIs send and receive input and output peripheral information.

Further note that the architecture of FIG. 14 can use other protocols (besides, or in addition to TCP/IP) to convey information across the CD-AD bridge 1412, such as USB, etc.

Figure 15:
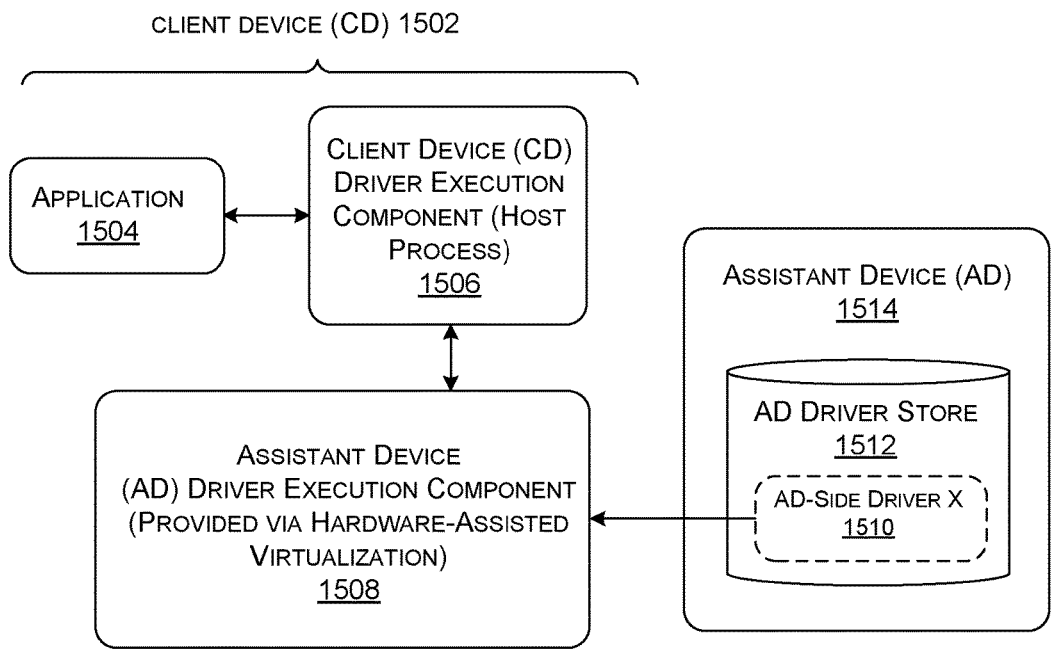
FIG. 15 shows a fourth implementation by which a client device and an assistant device execute a driver program. Here, the client device hosts assistant device-related processes via hardware-assisted virtualization.

FIG. 15 shows an example in which a client device 1502 hosts an application 1504 and a CD driver execution component 1506. Further, the client device 1502 uses hardware-assisted virtualization to provide an isolated runtime for the AD driver execution component 1508. The AD driver execution component 1508 runs an AD-side driver X 1510, which it obtains from an AD driver store 1512 of an assistant device 1514. The CD driver execution component 1506 and the AD driver execution component 1508 can use any strategy to interact with each other, such as the functionality described above with respect to FIGS. 13 and 14.

Figure 16:
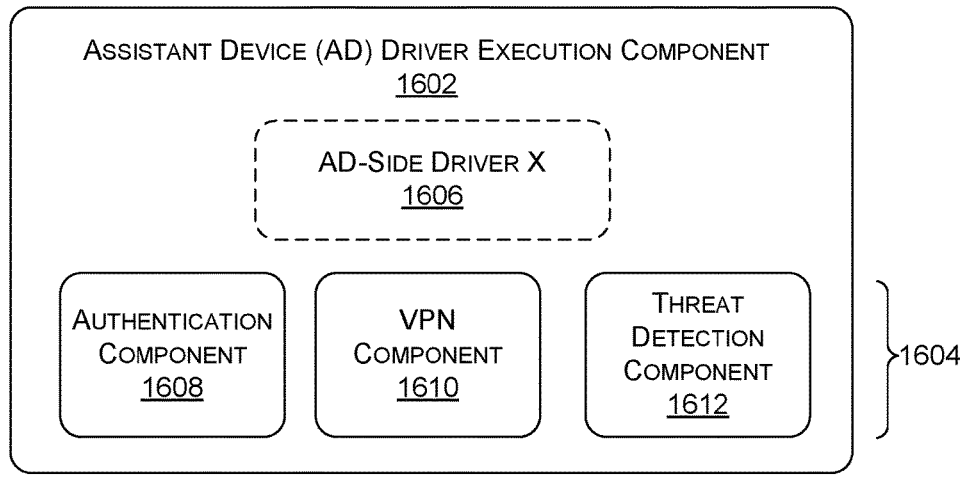
FIG. 16 shows an assistant device (AD) driver execution environment. That environment incorporates one or more security-related components.

FIG. 16 shows an implementation in which an AD driver execution component 1602 can include a collection of one more additional mechanisms 1604 to safeguard the resources of a client device, and the system 102 as a whole, when it runs an AD-side driver X 1606. The mechanisms 1604 can include an authentication component 1608, a VPN component 1610, and a threat detection component 1612. The authentication component 1608 uses one or more authentication protocols to ensure that only authorized entities interact with the assistant device associated with the AD driver execution component 1602. For example, the authentication component 1608 can use any certificate-based protocol, any password-based protocol, the Kerberos protocol, and so on. The VPN component 1610 enables communication with entities via a Virtual Private Network (VPN). For instance, the AD driver execution component 1602 can use a VPN to interact with a client device, and/or to manage interaction with other entities (e.g., an install service) on behalf of the client device, etc. The threat detection component 1612 can examine the AD-side driver X 1606 to determine if it poses any security risks. The threat detection component 1612 performs this task by comparing the signature of the AD-side driver X 1606 against a database of known threat signatures.

Figure 17:
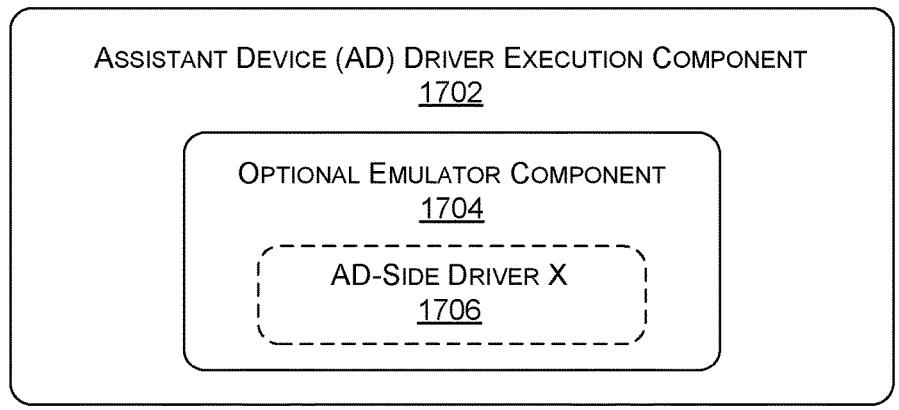
FIG. 17 shows an AD driver execution environment that incorporates the use of an emulation component.

FIG. 17 shows an implementation in which an AD driver execution component 1702 uses an emulator component 1704. In operation, the emulator component 1704 can use known emulator functionality to emulate the operation of an AD-side driver X 1706 with respect to a specified native processing environment.

For example, assume that the AD driver execution component 1702 operates in a native processing environment that is based on an x86 instruction set. Assume that the AD-side driver X 1706 is also configured to operate in this native processing environment. But assume that a client device uses a different native processing environment, e.g., based on an ARM-based instruction set. The emulator component 1704 can execute the AD-side driver X 1706 as if it was running on an ARM-based processing platform. In this manner, the AD driver execution component 1702 provides driver output information to the client device in a form that is compatible with the native environment associated with the client device. It is also possible to execute an ARM-based driver program as if it was running in a native x86 environment. In other examples, a downloaded driver program may itself perform an emulation function, without the use of a separate emulator component.

As mentioned above, any of the systems described above can also addresses driver compatibility issues by allocating a driver execution task to an environment that is capable of performing that task. For instance, assume that an application program seeks to run a legacy driver program that relies on a particular instruction set. The management functionality of the system can use instruction set compatibility as one factor in determining whether to run the driver program on a client device or its associated assistant device, e.g., by choosing an environment having a matching instruction set. In other cases, described below, a client device can choose from among a set of possible assistant devices. The assistant devices can vary in various ways, such as by providing different driver programs, providing different kinds of execution environments, and so on.

Figure 18:
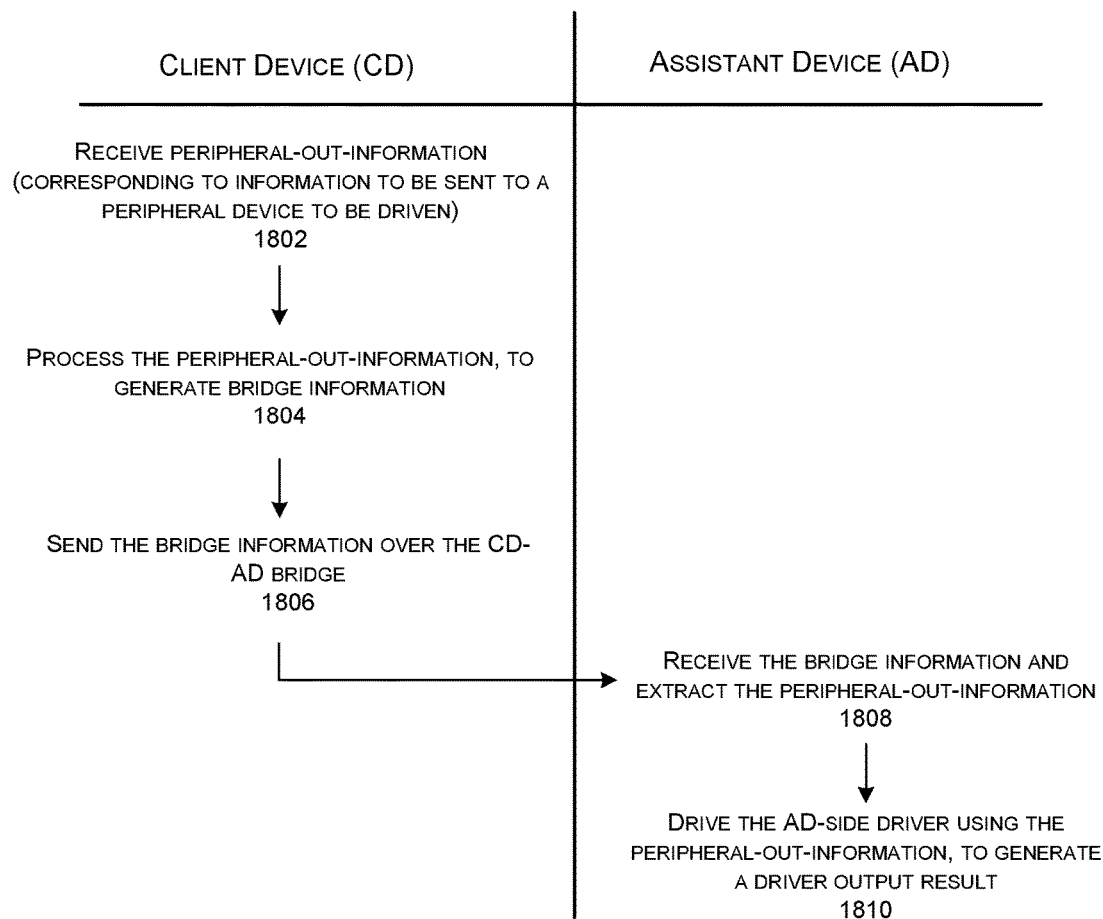
FIGS. 18 and 19 show illustrative action flows by which an AD driver execution environment can interact with a client device (CD) driver execution environment using a general-purpose bridge.

FIG. 18 shows one illustrative action flow that summarizes the operation of the implementation shown in FIG. 14, with respect to the path 1428. In operation 1802, the CD-side network stack functionality 1410 receives peripheral-out-information, corresponding to peripheral information to be sent to the peripheral device 1406. In operation 1804, the CD-side network stack functionality 1410 processes the peripheral-out-information to generate bridge information. As part of that operation, the CD-side network stack functionality 1410 discovers the existence and address associated with the assistant device 1420. In operation 1806, the CD-side network stack functionality 1410 sends the bridge information over the general-purpose CD-AD bridge 1412. In operation 1808, the AD-side network stack functionality 1422 receives the bridge information and extracts the peripheral-out-information. In operation 1810, the peripheral driver 1426 is driven based on the peripheral-out-information, to generate a driver output result.

Figure 19:
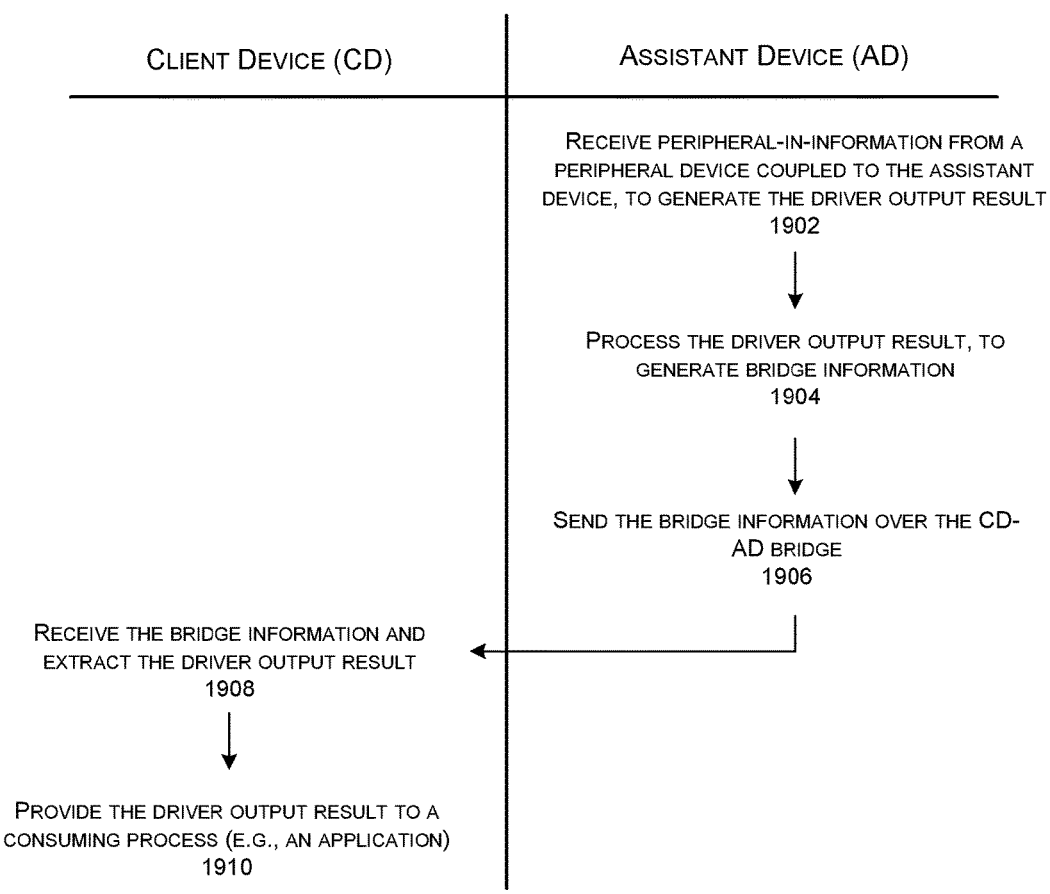

FIG. 19 shows one illustrative action flow that summarizes the operation of the implementation shown in FIG. 14, with respect to the path 1430. In operation 1902, the peripheral driver 1426 receives peripheral-in-information from the peripheral device 1406, to provide a driver output result. In operation 1904, the AD-side network stack functionality 1422 processes the driver output result, to generate bridge information. In operation 1906, the AD-side network stack functionality 1422 sends the bridge information over the general-purpose CD-AD bridge 1412. In operation 1908, the CD-side network stack functionality 1410 receives the bridge information and extracts the driver output result. In operation 1910, the CD-side network stack functionality 1410 provides the driver output result (and the associated peripheral-in-information) to the application 1404 (or other consuming process).

Overall, an assistant device improves the ability of a client device to execute driver programs (and other programs); this effect, in turn, enables the client device to more successfully interact with a greater universe of peripheral devices and other components. The assistant device also reduces the burden placed on the limited resources of the client device when executing program tasks. The assistant device can also reduce risk associated with running a driver program

A.4. Offloading Other Device Processes Using an Assistant Device

As noted in Subsection A.1, the system 102 described above is not limited to the downloading and executing driver programs. Rather, the system 102 can be applied to offload any device process from a client device to an assistant device. The process that is downloaded may correspond to an application process, a system process, or some combination thereof. The assistant device can be provisioned to include a set of hardware features that enable it to perform whatever process it is expected to handle. For example, an assistant device that is expected to perform the same kind of network-interaction role as the client device can include a communication mechanism that allows it to interact with the computer network 202.

More generally, this subsection makes reference to client devices, assistant devices, and various subcomponents thereof. These devices and subcomponents may correspond to instantiations of the same-named devices and components mentioned in the previous subsections.

Figure 20:
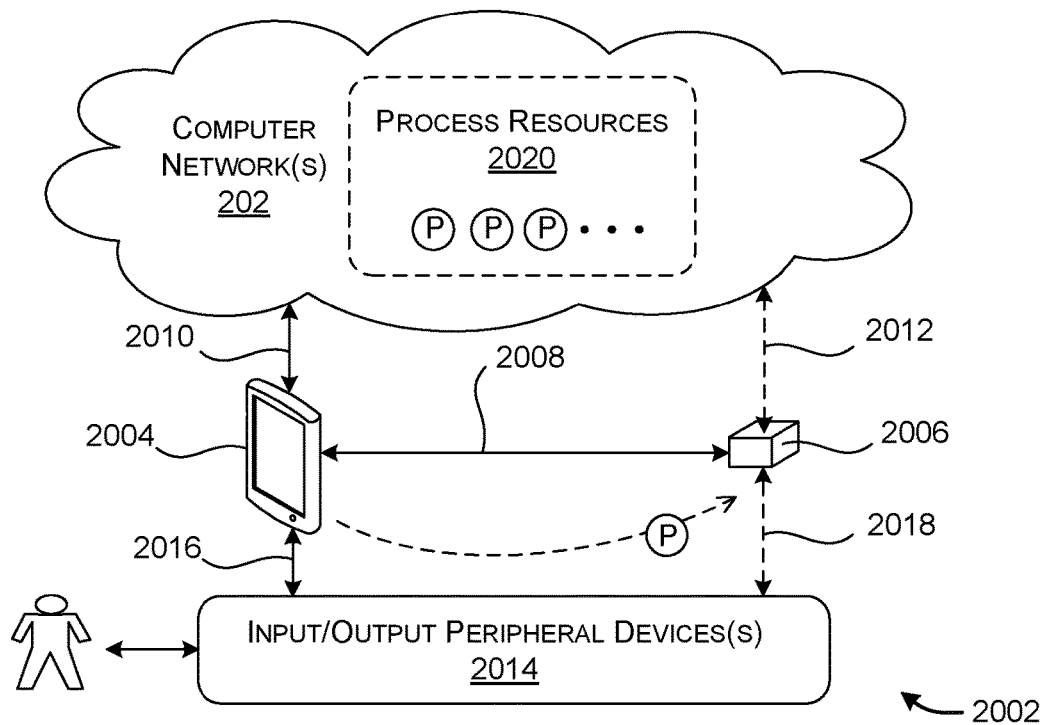
FIG. 20 shows a system that includes a client device and an assistant device, corresponding to a generalization of the system of FIG. 2.

FIG. 20 shows a system 2002 that represents a more general counterpart of the system 102 illustrated in FIG. 2. Here, a client device 2004 interacts with at least one assistant device 2006 by offloading a process P to the assistant device 2006. The client device 2004 is communicatively coupled to the assistant device 2006 via the communication link 2008. The client device 2004 and (optionally) the assistant device 2006 are also communicatively coupled to the computer network 202 via the communication links (2010, 2012), respectively. An end user can interact with the client device and/or the assistant device 2006 using one or more peripheral devices 2014, via links (2016, 2018). In one implementation, the client device 2004 can have the same architecture shown in FIG. 3, while the assistant device 2006 can have the same architecture shown in FIG. 4.

The client device 2004 and/or assistant device 2006 can perform at least some of their functions by interacting with one or more remote process resources 2020. For example, some of these processing resources may correspond to network-accessible sites which perform respective download-related functions, such as driver and application download functions. In other implementations, the remote process resources 2020 may offer remote storage, data and/or application services, e.g., in the context of a website or gaming service. In other implementations, the remote process resources 2020 may implement one or more virtual instances of assistant devices.

Figure 21:
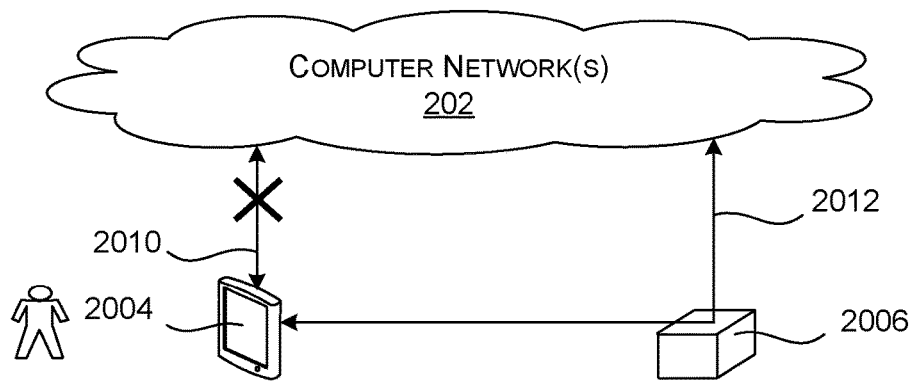
FIG. 21 shows one application of the system of FIG. 20.

FIG. 21 shows one application of the system 2002 of FIG. 20. Here, a CD management component of the client device 2004 (and/or some other management functionality or agent) receives an alert when a process being run by the client device 2004 attempts to establish a network connection (e.g., a TCP connection) with a network-accessible entity, e.g., by invoking a network address associated with that entity. A CD management component then determines whether it is appropriate for the client device 2004 to establish this connection (and to handle any subsequent interaction over this connection), or whether it is appropriate to instruct the assistant device 2006 to establish this connection.

The CD management component can make the above-noted determination based on one or more factors. Without limitation, the factors can include: the amount of work that is currently being performed and/or is scheduled to be performed by the client device 2004 and the assistant device 2006; the amount of power available to the client device 2004 and the assistant device 2006; the explicit and inferred preferences of the end user; the processing, memory, and communication capabilities of the client device 2004 and the assistant device 2006; the reliability with which the client device 2004 and the assistant device 2006 have been able to perform the process on prior occasions, and so on. The CD management component can make its decision using any equation, algorithm, rules-based system, statistical machine-trained model, and so on, or any combination thereof.

Assume that a decision is made to offload the task of establishing a network connection to the assistant device 2006. In one (full offload) case, the assistant device 2006 can establish this connection in an independent and autonomous manner from the client device 2004. In another (transparent bridging) case, the client device 2004 can manage the manner in which the assistant device 2006 forms connections. Further, in certain cases, the assistant device 2006 may not provide its own communication interface component. In that scenario, the assistant device 2006 can use the CD communication interface component 322 to establish the connection.

Figure 22:
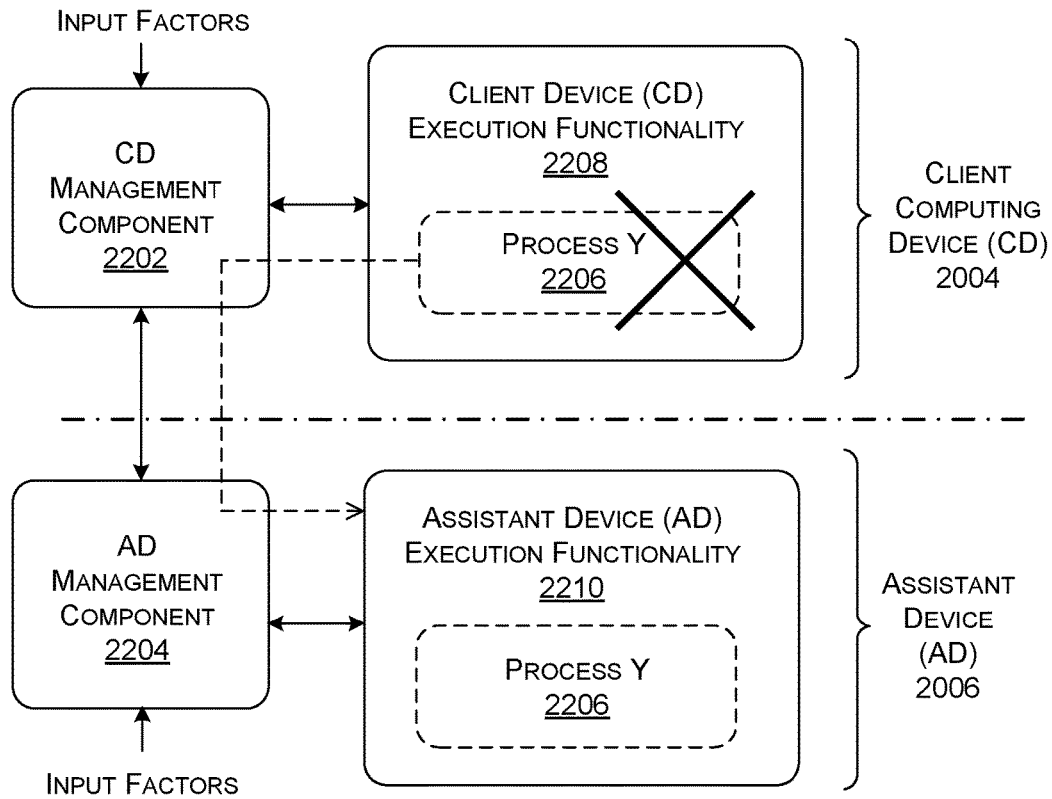
FIG. 22 shows further illustrative details regarding the system of FIG. 21.

FIG. 22 is a component diagram that illustrates the operation of the system 2002 of FIG. 21. Here, a CD management component 2202 (and/or the AD management component 2204) and/or some other agent determines that it appropriate to offload a process Y 2206 from a CD execution functionality 2208 to an AD execution functionality 2210. The process Y 2206 involves establishing a network connection with the computer network 202.

Figure 23:
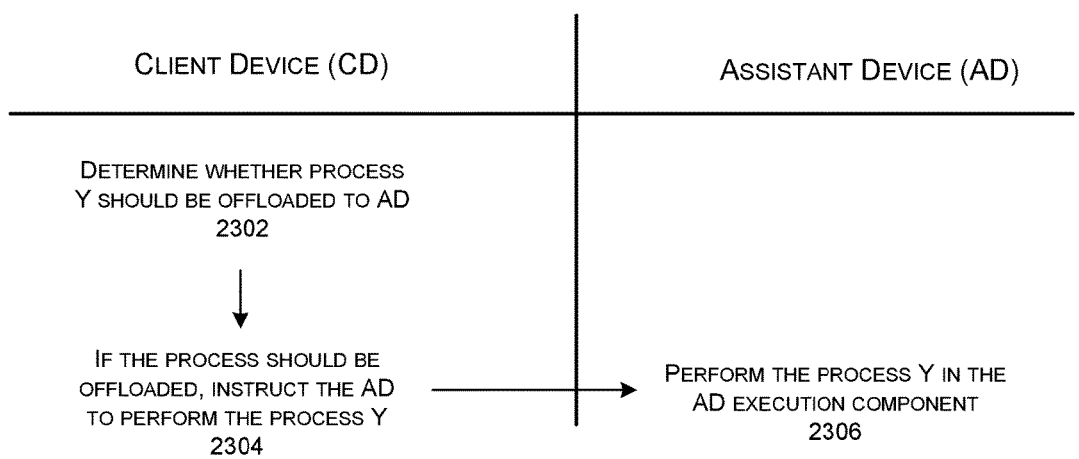
FIG. 23 shows an illustrative action flow that explains one manner of operation of the system of FIG. 21.

FIG. 23 shows an illustrative action flow that explains one manner of operation of the system 2002 of FIG. 20. In operation 2302, the client device 2004 determines whether a process Y 2206 should be offloaded to the assistant device 2006. In operation 2304, if a decision is made to offload the process Y 2206, the client device 2004 instructs the assistant device 2006 to perform the process Y 2206. In operation 2306, the assistant device 2006 performs the process Y 2206, which entails establishing a network connection.

In another distributed scenario, the client device 2004 can use the resources of the assistant device 2006 (or multiple assistant devices) to upload data to a network-accessible source.

A.5. Offloading Device Processes in Multi-Device Scenarios

This subsection extends the principles set forth above to scenarios that entail the use of multiple user devices and/or assistant components. More generally, this subsection refers to client devices, assistant devices, and various subcomponents thereof. These devices and subcomponents may correspond to instantiations of the same-named devices and components mentioned in the previous subsections.

Figure 24:
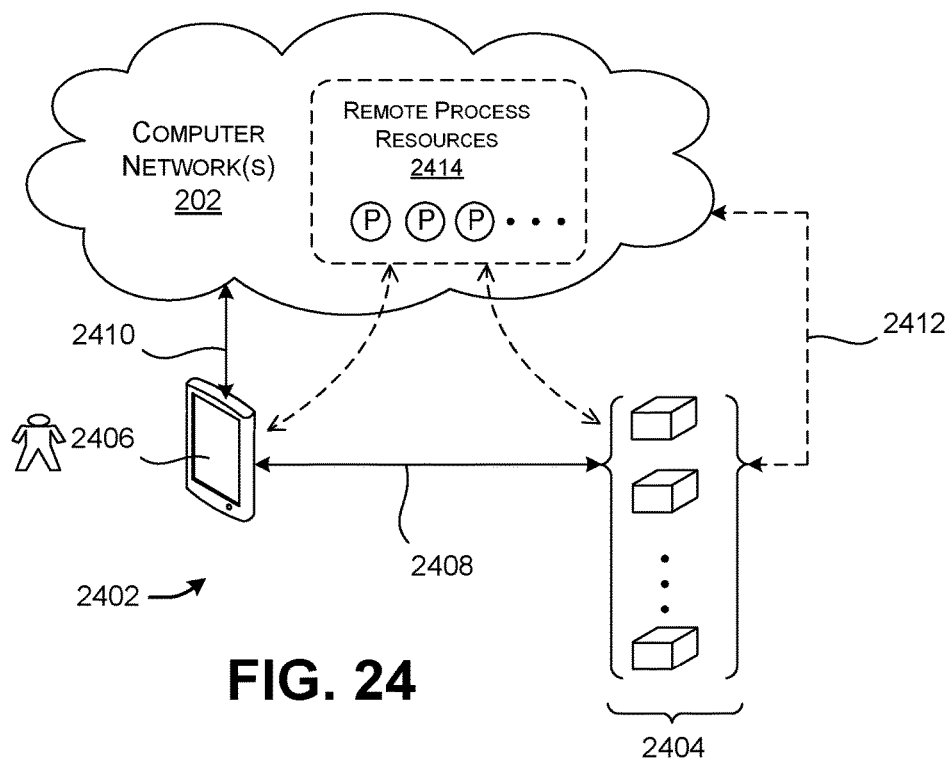
FIG. 24 shows a system that extends the functionality of FIG. 2 or FIG. 20 by using plural assistant devices, two or more of which may interact with a single client device.

To begin with, FIG. 24 shows a system 2402 that extends the functionality of FIG. 2 or FIG. 20 by using plural assistant devices 2404, two or more of which may interact with a single client device 2406. A communication link 2408 (e.g., a USB link, BLUETOOTH link, Wi-Fi link, etc.) communicatively couples the client device 2406 with any of the assistant devices 2404. A communication link 2410 communicatively couples the client device 2406 with the computer network 202. A communication link 2412 optionally communicatively couples the assistant devices 2404 with the computer network 202. More specifically, the communication link 2412 may represent a single shared link, or plural communication links associated with the respective assistant devices 2404. A plurality of remote process resources 2414 may be available to the client device 2406 and the assistant devices 2404 in executing processes. Although not specifically identified in FIG. 24, a CD-AD bridge of the type described in Subsection A.3 can be used to couple the client device 2406 with each assistant device.

The client device 2406 can gain knowledge of the assistant devices 2404 (and the capabilities of the assistant devices 2404) in one or more ways described above (e.g., with reference to FIG. 13), to define a pool of available assistant devices. The client device 2406 can then choose among candidate assistant devices in any manner. For instance, the CD management component of the client device 2406 (and/or any other determination logic provided by any other agent) can make this decision based on one or more factors. Without limitation, the factors include: the power available to client device 2406 and each candidate assistant device; the current failure status of each candidate assistant device; the location of the client device 2406 relative to each candidate assistant device; the respective capabilities of the client device 2406 and each candidate assistant device (including the program assets and execution environment of the client device 2406 and each candidate assistant device); the explicit and inferred preferences of the end user; the performance of the client device 2406 and each candidate assistant device; security-related implications pertaining to the use of the client device 2406 and/or each candidate assistant devices, and so on. The CD management component can make its decision based on any one factor, or based on a combination of factors (e.g., by using any equation, algorithm, rules-based system, statistical machine-trained model, and so on).

The CD management component can estimate the projected performance of a device in different ways. Consider the case in which a process to be potentially offloaded involves interaction with a network-accessible entity. The CD management component can measure, for each candidate assistant device, the round trip time (RTT) involved in performing that process. In addition, or alternatively, the CD management component can determine prior reliability of each assistant device in performing the process under consideration, e.g., by accessing a data store which provides a history of network connections that have been attempted using different assistant devices 2404. If the client device 2406 has (or is) connected to multiple networks, the client device 2406 can consult an instance of the history of the network connections on a per-network basis.

In yet another implementation, the CD management component can instruct the client device 2406 to switch among the available assistant devices 2404 based on any load balancing consideration and/or other type of fairness consideration(s). For example, the CD management component can instruct the client device 2406 to switch among the assistant devices 2404 in round-robin fashion, or based on the prevailing workload of the assistant devices, and/or based on any other factor(s). In yet another implementation, the CD management component can instruct the client device 2406 to switch from a first assistant device to a second assistant device upon failure or unavailability of the first assistant device.

Figure 25:
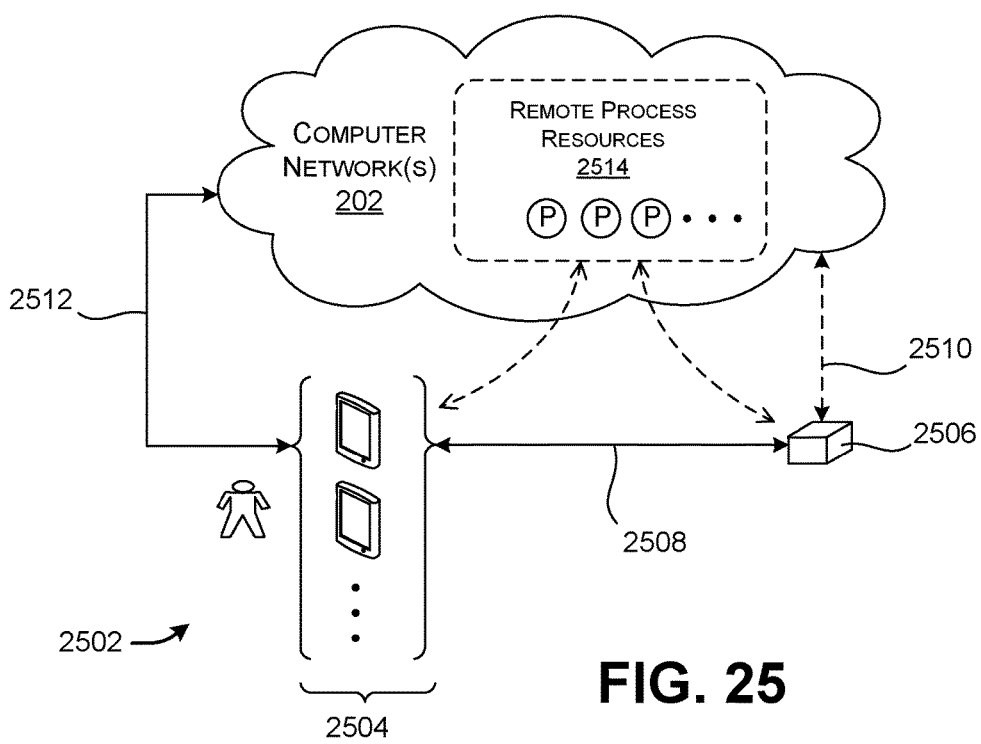
FIG. 25 shows a system that extends the functionality of FIG. 2 or FIG. 20 by using plural client devices, two or more of which may interact with a single assistant device.

FIG. 25 shows a system 2502 that extends the functionality of FIG. 2 or FIG. 20 by using plural client devices 2504. The plural client devices 2504 may interact with a single assistant device 2506. Although not shown, the system 2502 of FIG. 25 can also incorporate the features of FIG. 24, where any single client device can interact with two or more assistant devices.

In the case of FIG. 25, a communication link 2508 (e.g., a USB link, BLUETOOTH link, Wi-Fi link, etc.) communicatively couples each client device with the assistant device 2506. The communication link 2508 represents a single shared link or separate respective links for the different client devices 2504. The assistant device 2506 is communicatively coupled to the computer network 202 via a communication link 2510. The client devices 2504 are coupled to the computer network via a communication link 2512. The communication link 2512 represents a single shared link or separate respective links for the different client devices. A plurality of remote process resources 2514 may be available to the client devices 2504 and the assistant device 2506 in executing processes. Although not specifically identified in FIG. 25, a CD-AD bridge of the type described in Subsection A.3 can be used to couple each client device with the assistant device 2506.

Figure 26:
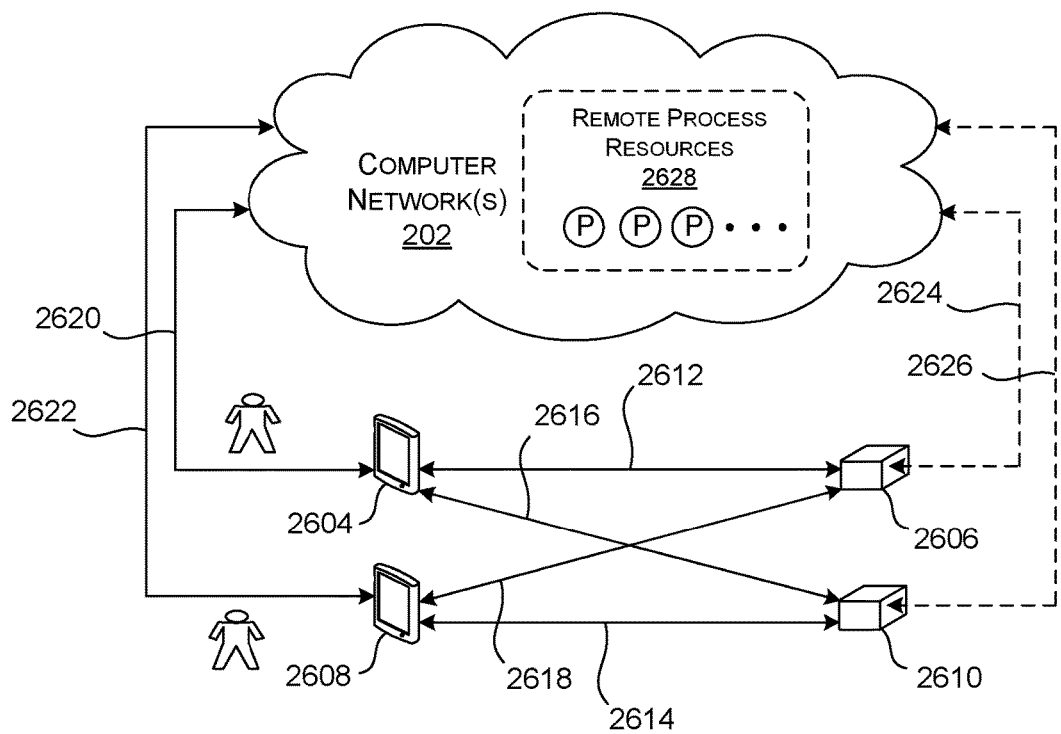
FIG. 26 shows a system that enables an end user to interact with the assistant device associated with another user.

FIG. 26 shows a system 2602 that enables an end user to interact with the assistant device associated with another user. That is, the system 2602 shows a client device 2604 and an assistant device 2606 that are associated with a first user, and a client device 2608 and assistant device 2610 that are associated with a second user. The system 2602 enables the first user to interact with both his or her assistant device 2606, as well as the assistant device 2610 of the second user. Similarly, the system 2602 enables the second user to interact with both his or her assistant device 2610, as well as the assistant device 2606 of the first user. The assistant devices (2606, 2610) provide appropriate authentication mechanisms that ensure that those accessing their resources are entitled to do so. That is, in this approach, the first user is expected to have granted the second user the ability to use his or her assistant device 2606, and the second user is expected to have granted the first user the ability to use his or her assistant device 2610.

Consider the scenario in which the first and second users are friends, members of the same family, or work colleagues, etc. Any such user may wish to access another's assistant device to account for the possibility that his or her own assistant device cannot be used, e.g., because it fails for any reason, because it is lost, or because it is left at home, etc. The person impacted by the inoperable assistant device can then use another's assistant device until his or her own assistant device becomes operable. In another scenario, a user may wish to access another's assistant device to pool the resources of that assistant device with his or her own assistant device, e.g., to realize enhance computing power to handle a computationally-intensive task. In another scenario, assume that another person's assistant device is coupled to a particular peripheral device (e.g., a printer, etc.) and has the appropriate driver program to interact with that device. But assume that the user's own assistant device cannot currently interact with the peripheral device (e.g., because it lacks the driver program or physical connectivity to the peripheral device). The user may wish to access the other person's assistant device because he or she wishes to make use of the peripheral device to which it is connected.

In any of these cases, the assistant device that is accessed can be local or remote with respect to the client device which accesses its resources.

The client devices (2604, 2608) may interact with the assistant devices (2606, 2610) using any hardwired or wireless communication links (2612, 2614, 2616, 2618). The client devices (2604, 2608) may interact with the computer network 202 via communication links (2620, 2622). The assistant devices (2606, 2610) may communicate with the computer network 202 via communication links (2624, 2626). The computer network 202 may host a collection of remote process resources 2628, any of which can be accessed by the client devices (2604, 2608) and the assistant devices (2606, 2610).

Figure 27:
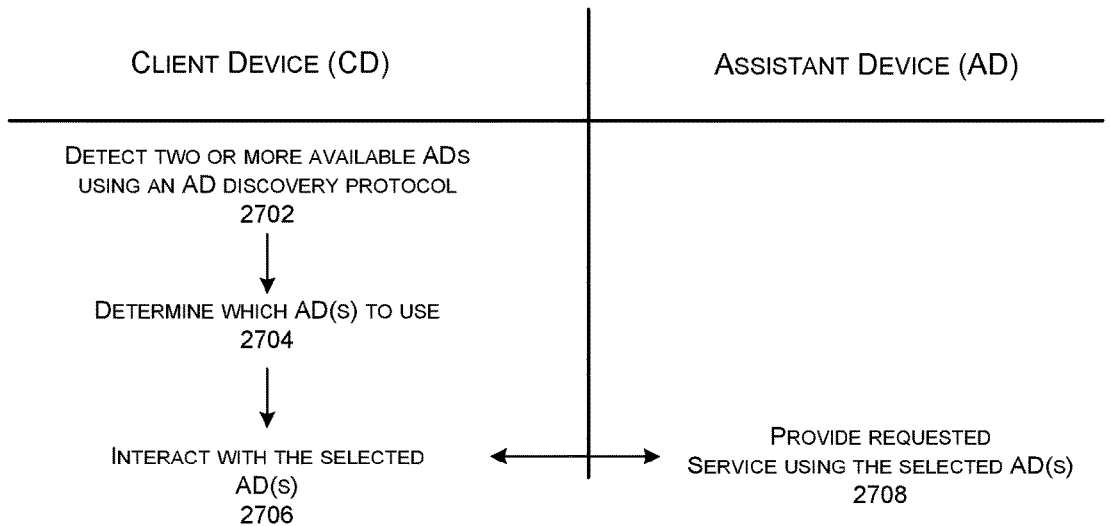
FIG. 27 shows an illustrative action flow that explains one manner of operation of the system of FIG. 24, where a client device can choose from among plural candidate assistant devices.

FIG. 27 shows an illustrative action flow that explains one manner of operation of the system 2402 of FIG. 24, where the client device 2406 can choose from among plural candidate assistant devices 2404. In operation 2702, the client device 2406 detects that two or more candidate assistant devices 2404 are available. In operation 2704, the client device 2406 selects one or more of the candidate assistant devices 2404. In operation 2706, the client device 2406 interacts with the selected assistant devices. In operation 2708, the selected assistant devices provide whatever service they are called on to give.

Figure 28:
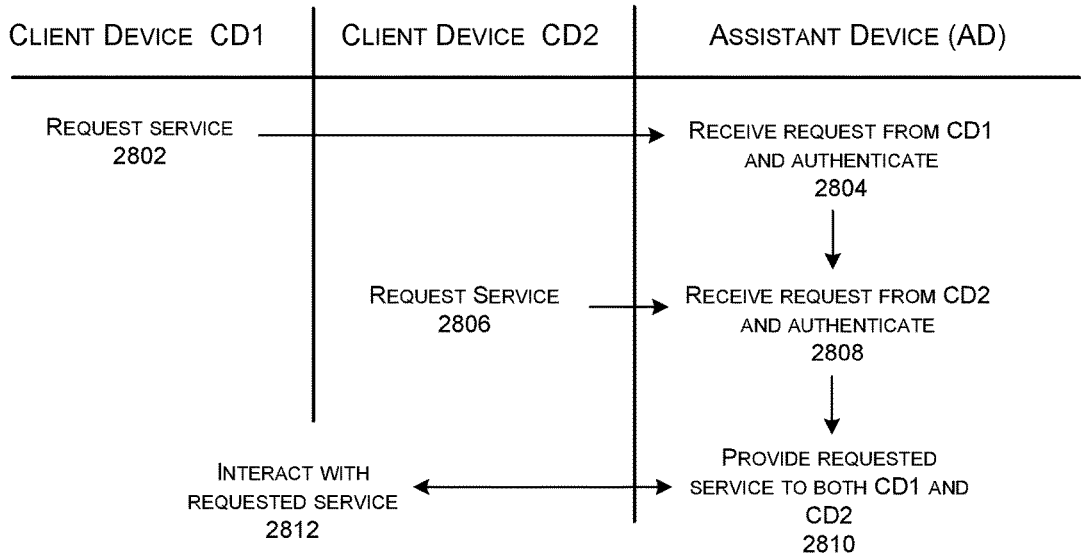
FIG. 28 shows an illustrative action flow that explains one manner of operation of the system of FIG. 25, where a single assistant device can interact with two or more properly authenticated client devices.

FIG. 28 shows an illustrative action flow that explains one manner of operation of the system 2502 of FIG. 25, where a single assistant device 2506 can interact with two or more client devices 2504, when properly authenticated. In operation 2802, a first client device requests service from the assistant device 2506. In operation 2804, the assistant device 2506 authenticates the first client device. In operation 2806, a second client device requests service from the assistant device 2506. In operation 2808, the assistant device 2506 authenticates the second client device. In operation 2810, the assistant device 2506 provides the requested service to the now-properly authenticated first and second user devices. In operation 2812, the first and second user devices receive the requested service.

The above subsections described various occasions in which a system makes a decision as to where a particular function is to be executed. As also mentioned above, any of these decisions can be made using any equation, algorithm, rules-based system, machine-learned model, etc., or any combination thereof.

A machine-learned model operates by accepting feature values which describe a plurality of factors that may play a role in the decision. The machine-learned model maps the feature values into a score value. One set of feature values may describe a particular candidate option (regarding a particular way of implementing a function). The score value may describe the appropriateness of the option. Overall, the system applies the machine-learned model to determine score values for a plurality of options, and then selects the option having the most favorable score. The machine-learned model is trained based on a corpus of training examples. Each training example maps a particular set of input factors to a chosen option, with a labeled indication of whether the option is appropriate or not. The machine training operation can use any machine-learning technique to produce any corresponding machine-trained model, such as by applying, without limitation, any of: a logistic regression technique; a support vector machine technique; a decision tree technique; a clustering technique; a neural network technique; a Bayesian network technique; and so on.

With respect to a rules-based system, an expert or team of experts can produce a collection of IF-THEN rules (or other types of logical postulates). Each IF-THEN rules maps a particular set of input conditions to an execution option (which describes how to execute a particular function). To cite one example, one rule may indicate that it is appropriate to execute a driver program using an assistant device when the driver program poses a security risk. In other cases, the system can use an artificial intelligence system, an expert system, etc. to make execution decisions.

A.6. Power Management

Returning to FIG. 13, that figure shows CD-side discovery functionality (CDDF) 1316 and AD-side discovery functionality (ADDF) 1318. As previously described, the CDDF 1316 interacts with the ADDF 1318 to discover the existence and capabilities of the assistant device 1310. For example, the CDDF 1316 can interact with the ADDF 1318 to determine the driver programs that are stored by the assistant device 1310 and the peripheral devices that are coupled to the assistant device 1310, if any.

In addition, the CDDF 1316 and the ADDF 1318 interact with each other to discover each other's power-related capabilities, to provide discovered power information. The CD management component (e.g., the CD management component 328 of FIG. 3) and/or the AD management component (e.g., the AD management component 420 of FIG. 4) can then use the discovered power information to determine how power is to be supplied to the client device 1306 and/or the assistant device 1310. The CDDF 1316 and the ADDF 1318 can exchange power information via the CD-AD bridge 1322 and/or through some other communication mechanism.

In a multi-assistant-device scenario and/or a multi-client-device scenario, the CDDF(s) of one or more client devices cooperate with the ADDF(s) of one or more assistant devices to provide discovered power information that describes the power capabilities of all client devices and assistant devices. One or more management components of one or more devices can then use the power information to determine how power is to be supplied to each device.

The power information that is collected by each CDDF and/or each ADDF can include, but is not limited to: the nature of a native power source that is available to each device, if any (where "device" refers to either a client device or an assistant device); whether a device can receive power from another device (e.g., whether a client device can receive power from an assistant device, or vice versa), given a particular connection; the amount of power that is available to each device; the preferences of the user (e.g., as conveyed by preference settings); the reliability of the power that is available to each device; the cost of power that is available to each device, and so on. The power information can also describe factors that pertain to the manner in which power will be utilized by the client device and/or the assistant devices. Those factors include, for instance: the projected processing task to be performed by the client device (and its projected power load); the likelihood that the client device will rely on the assistant device in performing the processing task, and so on. The discovery functionality can identify the projected processing task to be performed based on an explicit request for that task by the user, and/or based on patterns of historical usage, etc.

A management component can use any environment-specific logic to determine how to provide power to a device. Consider the case in which only one client device is coupled to a single assistant device. Further consider the situation in which: (a) both the client device and the assistant device are powered by batteries; and (b) both the client device and the assistant device can receive power from each other. A user-specific preference rule may instruct the client device to receive power from the assistant device, or vice versa. In addition, or alternatively, if the difference between the amount of power available to the client device and the assistant device is greater than a threshold value, then the device with more power can deliver power to the device with less power. In addition, or alternatively, if the amount of power of a device falls below an environment-specific threshold value, it will henceforth receive power from the other device, unless that other device is in a similar situation.

In a multi-assistant device scenario, where all devices are powered by batteries, the CD management component can instruct the client device to connect to the assistant device having the greatest amount of power, and receive power therefrom (depending on user preferences, and/or the difference between the amount of power available to the client device and the amount of power available to the chosen assistant device, etc.). A client device can optionally disconnect from a first assistant device and connect to a second assistant device when the amount of power available to the first assistant device reaches a prescribed absolute or relative threshold value. In another case, the client device can disconnect from the first assistant device when it determines that both its own power and the assistant device's power are below the threshold value. In other cases, a client device can receive power from two or more assistant devices.

Still other implementations can use other power-related rules. The above power-related rules are cited by way of example, not limitation.

B. Illustrative Processes

Figure 29:
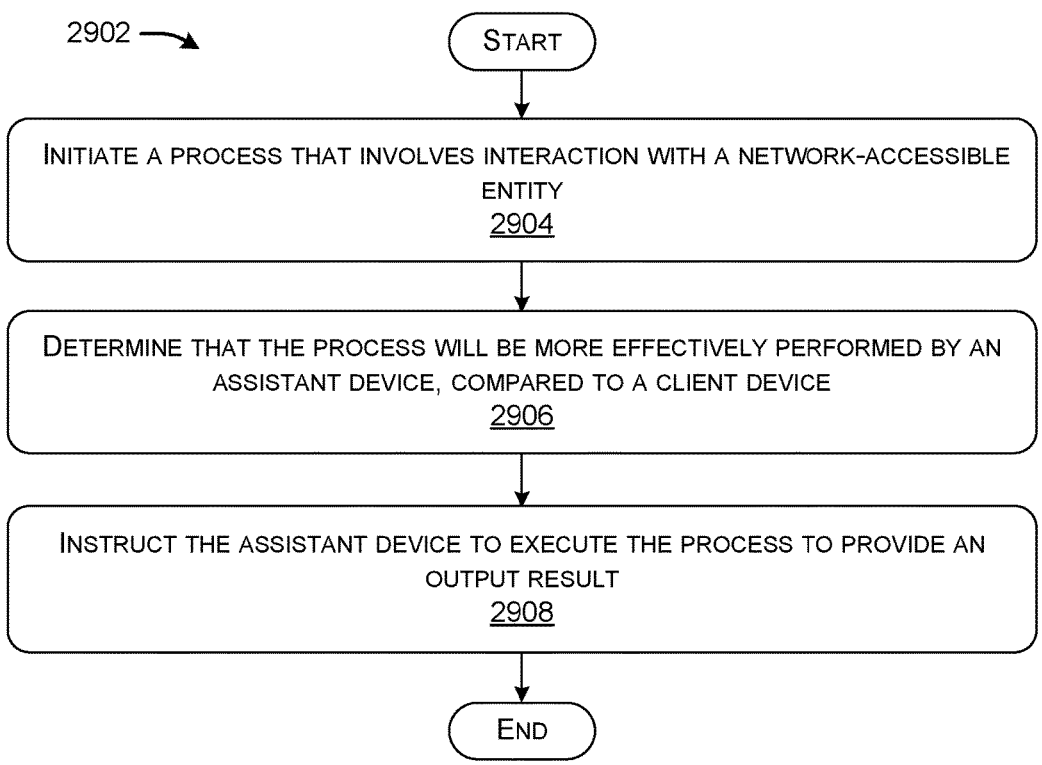
FIG. 29 shows a process that explains one manner of operation of the system of FIG. 1, in the context of performing a process that involves interaction with a network-accessible entity.
Figure 30:
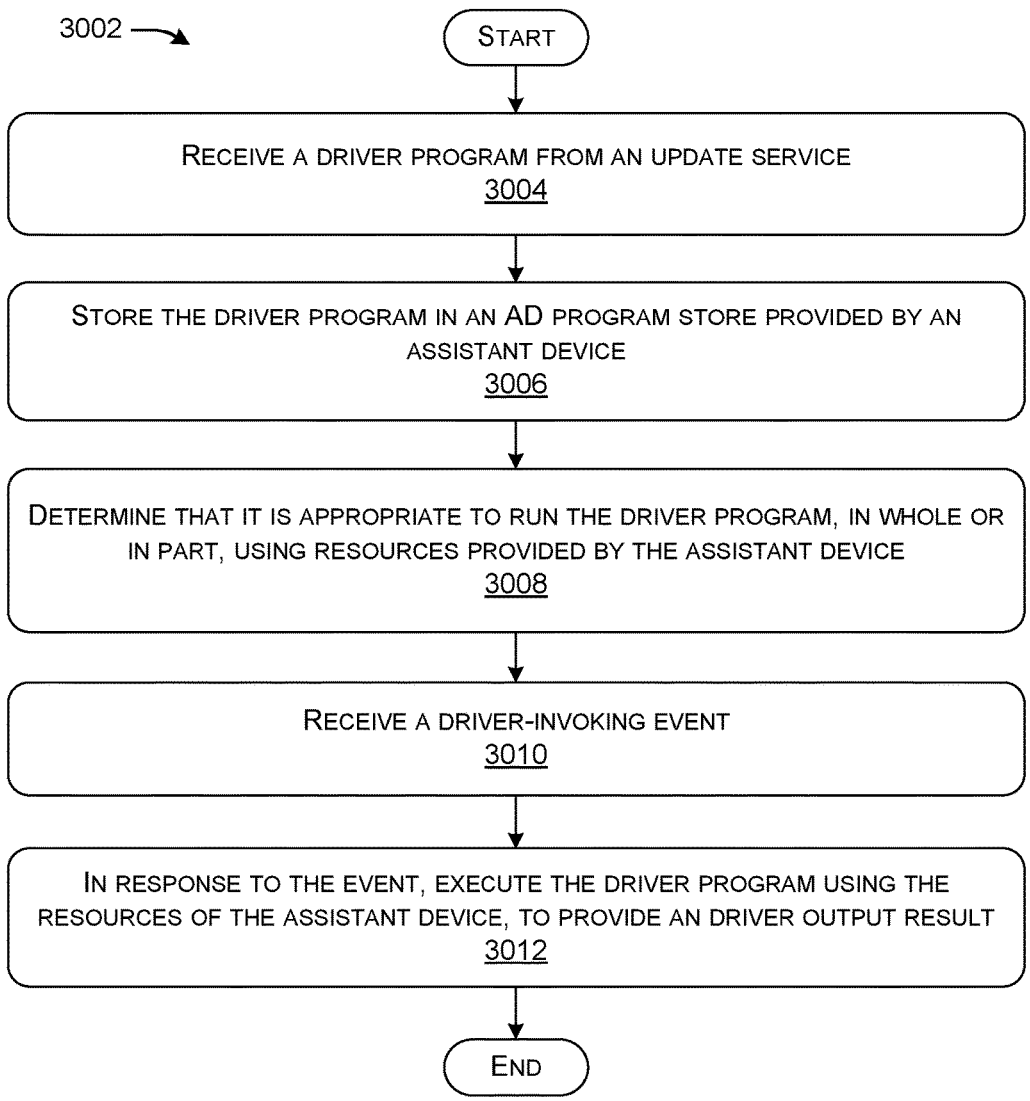
FIG. 30 shows a process that explains one manner of operation of the system of FIG. 1, in the context of executing a driver program.

FIGS. 29 and 30 show processes (2902, 3002) that explain the operation of the system 102 of Section A (and any other system described in Section A) in flowchart form. Since the principles underlying the operation of system 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

FIG. 29 shows a process 2902 for offloading a computer-implemented process. In block 2904, the client device 104 initiates a process that involves interaction with a network-accessible entity, such as an update service. In block 2906, the client device 104 determines that the process will be more effectively performed by the assistant device 106, compared to the client device 104. In block 2908, the client device 104 instructs the assistant device 106 to execute the process to provide an output result. In one scenario, the process 2902 may enable the client device 104 and the assistant device 106 to cooperatively obtain a driver program from an update service. In another scenario, the process 2902 may enable the client device 104 and the assistant device 106 to cooperatively establish a network connection, such as a TCP connection.

FIG. 30 shows a process 3002 for executing a driver process. In block 3004, the assistant device 106 receives a driver program from an update service. In block 3006, the assistant device 106 stores the driver program in a AD program store provided by the assistant device 106, the AD driver store being separate from a CD driver store provided by the client device 104. In block 3008, some agent (such as the client device 104 and/or the assistant device 106) determines that it is appropriate to run the driver program, in whole or in part, using resources provided by the assistant device 106. As noted above, the agent can make this determination based on one or more factors. In block 3010, the system 102 receives a driver-invoking event. In block 3012, the system 102, in response to the instruction, executes the driver program using the resources of the assistant device 106, to thereby provide a driver output result.

C. Representative Computing Functionality

Figure 31:
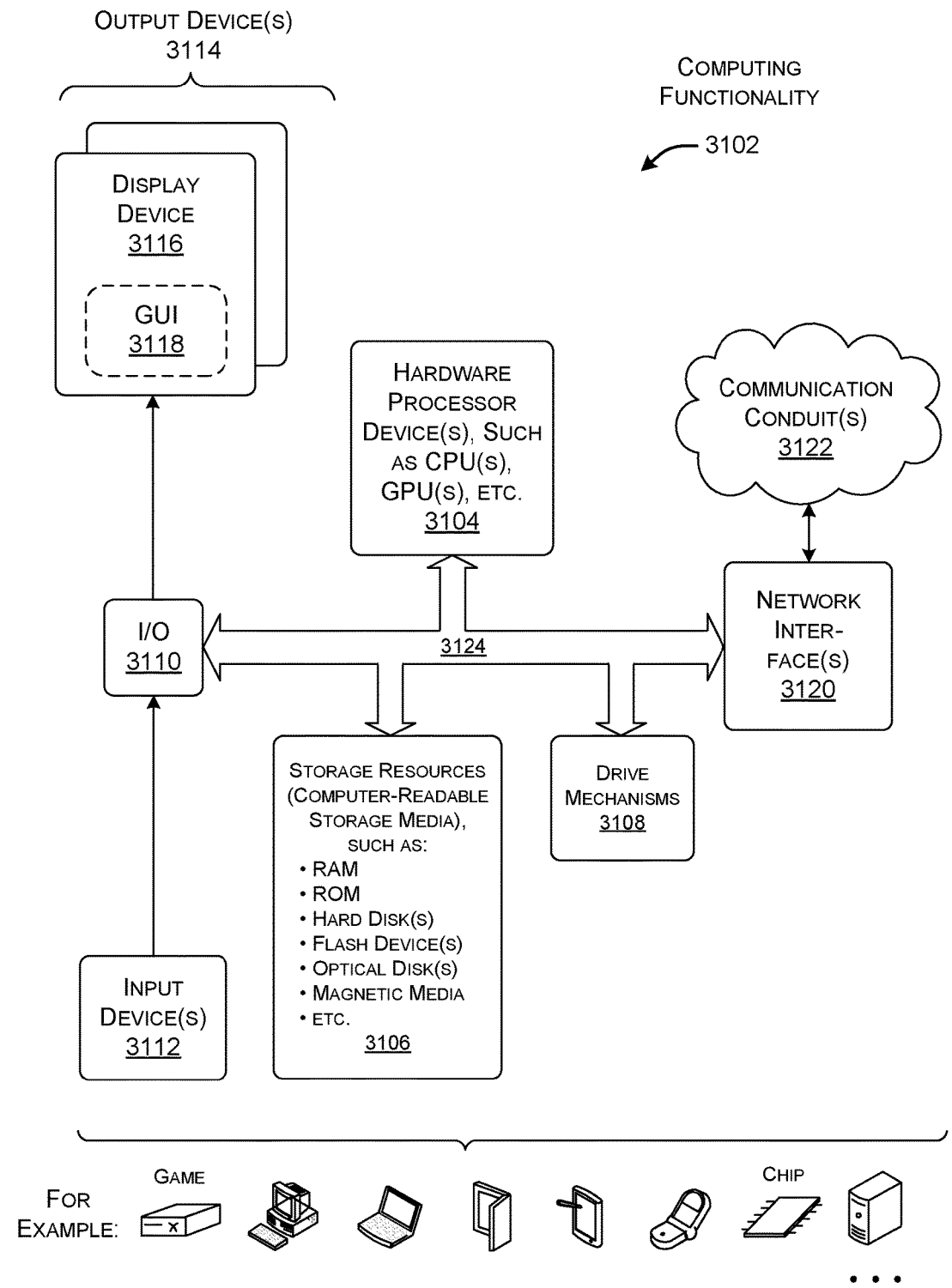
FIG. 31 shows illustrative computing functionality that can be used to implement any aspect of the features shown in the foregoing drawings.

FIG. 31 shows computing functionality 3102 that can be used to implement any aspect of the mechanisms set forth in the above-described figures. For instance, the type of computing functionality 3102 shown in FIG. 31 can be used to implement any client device and/or any assistant device and/or any network-accessible entity described above. In all cases, the computing functionality 3102 represents one or more physical and tangible processing mechanisms.

The computing functionality 3102 can include one or more hardware processor devices 3104, such as one or more central processing units (CPUs), and/or one or more graphical processing units (GPUs), and so on. The computing functionality 3102 can also include any storage resources (also referred to as computer-readable storage media or computer-readable storage medium devices) 3106 for storing any kind of information, such as machine-readable instructions, settings, data, etc. Without limitation, for instance, the storage resources 3106 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 3102. The computing functionality 3102 may perform any of the functions described above when the hardware processor device(s) 3104 carry out computer-readable instructions stored in any storage resource or combination of storage resources. The computing functionality 3102 also includes one or more drive mechanisms 3108 for interacting with any storage resource, such as a hard disk drive mechanism, an optical disk drive mechanism, and so on.

The computing functionality 3102 also includes an input/output component 3110 for receiving various inputs (via input devices 3112), and for providing various outputs (via output devices 3114). Illustrative input devices include a keyboard device, a mouse input device, a touch screen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 3116 and an associated graphical user interface presentation (GUI) 3118. The display device 3116 may correspond to a charge-coupled display device, a cathode ray tube device, a projection mechanism, etc. Other output devices include a printer, a model-generating mechanism, a tactile output mechanism, an archival mechanism (for storing output information), and so on. The computing functionality 3102 can also include one or more network interfaces 3120 for exchanging data with other devices via one or more communication conduits 3122. One or more communication buses 3124 communicatively couple the above-described components together.

The communication conduit(s) 3122 can be implemented in any manner, e.g., by a local area computer network, a wide area computer network (e.g., the Internet), point-to-point connections, etc., or any combination thereof. The communication conduit(s) 3122 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 3102 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method for offloading a process is described. The method includes: initiating a process that involves interaction by a client device with a network-accessible entity; determining whether the process will be more effectively performed by an assistant device, compared to the client device; and instructing the assistant device to execute the process to provide an output result, when a determination is made that the process will be more effectively performed by the assistant device. The client device corresponds to a principal mechanism through which an end user interacts with one or more applications. The assistant device corresponds to a local or remote satellite device with respect to the client device that provides supplemental resources for use by the client device. The assistant device is communicatively coupled to the client device. Further, the assistant device and/or the client device are communicatively coupled to a computer network, through which the network-accessible entity is accessible.

According to a second aspect, the network-accessible entity is an update service, and the process involves obtaining a needed program from the update service.

According to a third aspect, the program is a driver program.

According to a fourth aspect, the above-referenced initiating includes: querying, by the client device, the update service to determine whether the update service contains an updated program that is not provided by the client device; and in response to the above-referenced querying, determining that the update service contains an updated program that is not provided by the client device, the updated program corresponding to the needed program.

According to a fifth aspect, the above-referenced initiating includes: receiving an event that indicates that a new peripheral device is attempting to interact with the client device or the assistant device, wherein the needed program corresponds to a driver program that is needed to interact with the new peripheral device; and determining, in response to the event, that the client device does not have the needed program.

According to a sixth aspect, the above-referenced determining includes: determining whether the assistant device already provides the needed program; in the case that the assistant device does not provide the needed program, determining a cost that will be incurred upon the client device obtaining the needed program from the update service; and determining that the cost satisfies a prescribed criterion, indicating that it will be more effective for the assistant device to obtain the needed program from the update service, rather than the client device.

According to a seventh aspect, there are two or more candidate assistant devices, and wherein the method further includes: discovering that the above-referenced two or more candidate assistant devices exist; and selecting at least one of the candidate assistant devices to use in the process based on one or more factors.

According to an eighth aspect, the above-referenced factor(s) include: capabilities of each candidate assistant device; and/or an availability of power to each candidate assistant device; and/or a location of each candidate assistant device relative to the client device; and/or a performance of each candidate assistant device, measured with respect to one or more performance metrics.

According to a ninth aspect, the process involves establishing a network connection with the network-accessible entity, and wherein the above-referenced initiating includes receiving an indication that the client device is attempting to establish the network connection with the network-accessible entity.

According to a tenth aspect, the assistant device also performs a display-docking function by presenting output information generated by at least one application that runs on the client device on a display output device.

According to an eleventh aspect, an assistant device (AD) is described herein that includes: an AD communication interface component configured to communicatively couple the assistant device to a client device (CD); an AD program store for storing one or more programs; and an AD management component. The AD management component is configured to: receive a query from the client device that seeks to determine whether the AD program store provides a needed program; provide the needed program to the client device in response to the query, when it is determined that the AD program store already contains the needed program; receive an instruction from the client device that instructs the assistant device to obtain the needed program from an update service, when it is determined that the AD program store does not have the needed program; in response to the instruction, download the needed program from the update service, to provide a downloaded program; and store the downloaded program in the AD program store.

According to a twelfth aspect, the needed program is a needed driver program.

According to a thirteenth aspect, the AD management component is further configured to, independent of an instruction from the client device, obtain needed programs from the update service upon discovering a need for the needed programs.

According to a fourteenth aspect, the AD management component is configured to determine a mode with which to download the program based on one or more factors, to provide a selected mode, and to download the program using the selected mode.

According to a fifteenth aspect, the assistant device is also configured to perform a display-docking function by presenting output information generated by at least one application that runs on the client device on a display output device.

According to a sixteenth aspect, the assistant device is also configured to send a message which alerts the client device to existence and capabilities of the assistant device.

According to a seventeenth aspect, wherein the assistant device further includes an authentication component that is configured to perform authentication with respect to each client device with which the assistant device interacts, to ensure that only properly authenticated client devices interact with the assistant device.

According to an eighteenth aspect, a system is described for performing a distributed updating operation. The system includes a client device (CD) and an assistant device (AD). The client device includes: a CD communication interface component that is configured to communicatively couple the client device with the assistant device; a CD program store that provides one or more programs; and a CD management component that is configured to update programs in the CD program store. The assistant device includes: an AD communication interface component that is configured to communicatively couple the assistant device with the client device; an AD program store that provides one or more programs; and an AD management component that is configured to update programs in the AD program store and/or the CD program store. The CD management component is configured to obtain a needed program by offloading at least one update task to the assistant device based on one or more factors.

According to a nineteenth aspect, the system further includes: logic configured to detect a need to obtain the needed program; logic configured to determine whether the assistant device provides the needed program in the AD program store; logic configured to, upon determining that the assistant device does not have the needed program, determine a cost of obtaining the needed program from an update service that provides the needed program; logic configured to use the client device to obtain the needed program from the update service when the cost is determined to satisfy a first criterion; logic configured to instruct the assistant device to obtain the needed program when the cost is determined to satisfy a second criterion; and logic configured to store the needed program in a program store.

According to a twentieth aspect, the AD management component is further configured to, independent of an instruction from the client device, obtain needed programs from the update service upon discovering a need for the needed programs.

According to a twenty-first aspect, a method is described, implemented by one or more computing devices, for executing a driver process. The method includes: receiving a driver program by an assistant device (AD) from an update service or other source, the assistant device corresponding to a local or remote satellite device with respect to a client device (CD) that provides supplemental resources for use by the client device; storing the driver program in an AD program store provided by the assistant device, the AD program store being separate from a CD program store provided by the client device; determining, using computer-implemented analysis, that it is appropriate to run the driver program, in whole or in part, using resources provided by an assistant device (AD), as opposed to running the driver program on the client device; receiving a driver-invoking event; and in response to the driver-invoking event, executing the driver program using the resources of the assistant device, to provide a driver output result. The client device corresponds to a principal mechanism through which an end user interacts with one or more applications. The assistant device is communicatively coupled to the client device. Further, the assistant device and/or the client device are communicatively coupled to a computer network.

According to a twenty-second aspect, the above-referenced determining that it is appropriate to run the driver program by the assistant device includes determining that the driver program poses a security risk to the client device.

According to a twenty-third aspect, the driver program is determined to pose a security risk when: the update service from which the driver program originates is determined to pose a security risk; and/or an access path of obtaining the driver program from the update service is determined to pose a security risk; and/or threat analysis performed on the driver program indicates that the driver program poses a security risk.

According to a twenty-fourth aspect, the assistant device includes an AD driver execution component, and wherein the above-referenced using of the resources of the assistant device includes using the AD driver execution component to execute the driver program, using processing and memory resources provided by the assistant device.

According to a twenty-fifth aspect, the above-referenced executing further includes determining whether the driver program poses a security-related risk.

According to a twenty-sixth aspect, the above-referenced executing includes emulating running of the driver program in a specified execution environment.

According to a twenty-seventh aspect, communication between the client device and the assistant device uses at least one authentication protocol to ensure that only properly authenticated client devices interact with the assistant device.

According to a twenty-eighth aspect, the assistant device uses a virtual private network to communicate with and/or on behalf of the client device.

According to a twenty-ninth aspect, the driver program controls interaction between the client device and a peripheral device, and wherein the above-referenced executing of the driver program takes place in a driver-execution process that includes: receiving peripheral-out-information from a process of the client device, the peripheral-out-information corresponding to information to be sent to the peripheral device; processing the peripheral-out-information to generate bridge information; sending the bridge information over a general-purpose bridge that couples the client device to the assistant device; receiving the bridge information at the assistant device and extracting the peripheral-out-information; and using the driver program to operate on the peripheral-out-information, to produce the driver output result.

According to a thirtieth aspect, the driver program controls interaction between the client device and a peripheral device, and wherein the above-referenced executing of the driver program takes place in a driver-execution process that includes: receiving peripheral-in-information from the peripheral device, to generate the driver output result; processing the driver output result to generate bridge information; sending the bridge information over a general-purpose bridge that couples the client device to the assistant device; receiving the bridge information at the client device and extracting the driver output result; and providing the driver output result to a process of the client device.

According to a thirty-first aspect, the assistant device includes the AD program store, and wherein the above-referenced executing of the driver program includes: providing an AD driver execution component on the client device using hardware-assisted virtualization resources on the client device; and using the client device to drive execution of the driver program in the AD driver execution component.

According to a thirty-second aspect, there are two or more candidate assistant devices, and wherein the above-referenced determining includes: discovering that the above-referenced two or more candidate assistant devices exist; and selecting at least one of the candidate assistant devices to run the driver program based on one or more factors.

According to a thirty-third aspect, the above-referenced one or more factors include: capabilities of each candidate assistant device; and/or monetary cost of using each candidate assistant device; and/or power available to each candidate assistant device; and/or a location of each candidate assistant device relative to the client device; and/or a performance of each candidate assistant device, measured with respect to one or more performance metrics.

According to a thirty-fourth aspect, wherein the method further includes: determining power capabilities of the client device and the assistant device, to provide discovered power information; and determining a manner of supplying power to the client device and/or the assistant device based on the discovered power information.

According to a thirty-fifth aspect, the discovered power information includes: an indication of a type of power source that is available to the client device and/or a type of power source that is available to the assistant device; and/or an indication of an amount of power that is available to the client device and/or an amount of power that is available to the client device; and/or an indication of whether the client device can receive power from the assistant device, and/or whether the assistant device can receive power from the client device; and/or an indication of a processing task to be performed by the client device, and an indication of whether the processing task is likely to rely on the assistant device.

According to a thirty-sixth aspect, an assistant device is described that includes an AD program store for storing a driver program received from an update service, the driver program controlling interaction with a peripheral device that is coupled to the assistant device. The assistant device further includes an AD driver execution component that is configured to: receive a driver-invoking event; and in response to the driver-invoking event, execute the driver program using resources of the assistant device, to provide a driver output result. The assistant device interacts with a client device (CD) via a general-purpose bridge that couples the assistant device with the client device. The general-purpose bridge conveys bridge information, the bridge information encapsulating peripheral information sent to and/or from the driver program. The client device corresponds to a principal mechanism through which an end user interacts with one or more applications. The assistant device and/or the client device are communicatively coupled to a computer network. Further, the assistant device is configured to execute driver programs associated with different types of peripheral devices, including network interface devices, input devices, and output devices.

According to a thirty-seventh aspect, the assistant device further includes logic for determining whether it is appropriate to run the driver program by the assistant device based on one or more factors.

According to a thirty-eighth aspect, the general-purpose bridge uses a uniform protocol to convey the peripheral information.

According to a thirty-ninth aspect, a system is described for performing a driver execution operation. The system includes a client device (CD) and an assistant device (AD). The client device includes: a CD communication interface component that is configured to communicatively couple the client device with the assistant device; a CD program store that provides one or more programs; and a CD execution component that is configured to execute programs in the CD program store. The assistant device includes: an AD communication interface component that is configured to communicatively couple the assistant device with the client device; an AD program store that provides one or more programs; and an AD execution component that is configured to execute programs in the AD program store. The system also includes discovery functionality by which at least the client device discovers an existence and capabilities of the assistant device. The system also includes allocation functionality that is configured to determine whether it is appropriate to offload at least one program execution task to the AD execution component. The AD execution component is configured to execute the above-referenced at least one program execution task when allocated to do so.

According to a fortieth aspect, the program is a driver program, and wherein the AD execution component is configured to: receive a driver-invoking event; and in response to the driver-invoking event, execute the driver program using resources of the assistant device, to provide a driver output result. The assistant device interacts with the client device via a general-purpose bridge that couples the assistant device with the client device. The general-purpose bridge conveys bridge information, the bridge information encapsulating peripheral information sent to and/or from the driver program.

A forty-first aspect corresponds to any combination (e.g., any permutation or subset) of the above-referenced first through fortieth aspects.

A forth-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through forty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
 obtaining information reflecting capabilities of a plurality of candidate assistant devices that are configured to communicate with a client device over respective local communication links, the plurality of candidate assistant devices providing supplemental resources for use by the client device;
 based at least on the capabilities of the plurality of candidate assistant devices, identifying a selected assistant device to execute a driver program on behalf of the client device, the driver program being configured to control a specific peripheral output device other than the client device; and
 sending a driver-invoking event from the client device to the selected assistant device over a selected local communication link, the selected assistant device executing the driver program using selected supplemental resources of the selected assistant device to provide a driver output result,
 wherein the driver output result is configured to control the specific peripheral output device.

2. The method of claim 1, further comprising:
determining that it is appropriate to run the driver program by the selected assistant device based at least on an indication that the driver program poses a security risk to the client device.

3. The method of claim 2, wherein the driver program is determined to pose the security risk when:
an update service or other source from which the driver program originates is determined to pose the security risk;
an access path of obtaining the driver program from the update service or other source is determined to pose the security risk; or
threat analysis performed on the driver program indicates that the driver program poses the security risk.

4. The method of claim 1, wherein the selected supplemental resources provided by the selected assistant device include processing and memory resources.

5. The method of claim 4, further comprising: sending the driver output result to the specific peripheral output device.

6. The method of claim 4, further comprising:
executing the driver program on the selected assistant device, the executing comprising emulating running of the driver program in an instruction set of the client device using an emulator that executes in another instruction set on the selected assistant device.

7. The method of claim 1, the capabilities reflecting round-trip times for individual assistant devices to contact a network-accessible entity.

8. The method of claim 7, further comprising: measuring the round-trip times for each of the individual assistant devices.

9. The method of claim 1, wherein the specific peripheral output device comprises a printer.

10. The method of claim 1, performed entirely by the client device.

11. The method of claim 1, wherein the client device lacks the driver program that is executed by the selected assistant device.

12. The method of claim 1, further comprising: discovering existence of the plurality of candidate assistant devices.

13. The method of claim 12, further comprising identifying the selected assistant device based at least on multiple factors comprising at least two of:
monetary cost of using each candidate assistant device;
power available to each candidate assistant device;
a location of each candidate assistant device relative to the client device; and
a performance of each candidate assistant device, measured with respect to one or more performance metrics.

14. The method of claim 1, further comprising:
determining power capabilities of the client device and the selected assistant device, to provide discovered power information; and
determining a manner of supplying power to the client device and/or the selected assistant device based at least on the discovered power information.

15. The method of claim 14, wherein the discovered power information includes at least one of:
an indication of a type of power source that is available to the client device and a type of power source that is available to the selected assistant device;
an indication of an amount of power that is available to the client device and an amount of power that is available to the selected assistant device; or
an indication of whether the client device can receive power from the selected assistant device, and whether the selected assistant device can receive power from the client device.

16. An assistant device comprising:
a storage resource configured to store a driver program received from an update service, the driver program being configured to control a specific peripheral output device that is coupled to the assistant device; and
a hardware processor that is configured to:
send, over a local communication link to a client device, information reflecting capabilities of the assistant device for executing the driver program;
send, to the client device over the local communication link, an indication that the driver program is available at the assistant device;
receive a driver-invoking event from the client device over the local communication link;
in response to the driver-invoking event, execute the driver program using resources of the assistant device to provide a driver output result; and
control the specific peripheral output device by communicating the driver output result to the specific peripheral output device.

17. The assistant device of claim 16, wherein the hardware processor is configured to:
determine whether it is appropriate to run the driver program by the assistant device based at least on one or more factors.

18. The assistant device of claim 16, wherein the specific peripheral output device is a printer.

19. A system comprising:
a client device,
an assistant device; and
a peripheral output device,
the client device including:
a client device communication interface that is configured to communicatively couple the client device with the assistant device;
a client device storage resource that provides one or more client device programs; and
a client device hardware processor that is configured to:
select the assistant device from among a plurality of candidate assistant devices to execute a particular driver program, based at least on information reflecting capabilities of the plurality of candidate assistant devices; and
execute the one or more client device programs in the client device storage resource;
the assistant device including:
an assistant device communication interface that is configured to communicatively couple the assistant device with the client device;
an assistant device storage resource that provides one or more assistant device programs; and
an assistant device hardware processor that is configured to:
execute the particular driver program on behalf of the client device to obtain a driver output result; and
control the peripheral output device on behalf of the client device by communicating the driver output result to the peripheral output device.

20. The system of claim 19, wherein the peripheral output device comprises a printer or a display device.

* * * * *